United States Patent [19]

Raychaudhuri

[11] Patent Number: 4,774,707
[45] Date of Patent: Sep. 27, 1988

[54] RANDOM ACCESS COMMUNICATION SYSTEM WITH SCHEDULED DATA TRANSMISSION AND ASYNCHRONOUS CONTENTION SCHEDULING

[75] Inventor: Dipankar Raychaudhuri, Kendall Park, N.J.

[73] Assignee: General Electric Company, Schenectady, N.Y.

[21] Appl. No.: 905,506

[22] Filed: Sep. 10, 1986

[51] Int. Cl.[4] .............................................. H04J 6/02
[52] U.S. Cl. ...................................... 370/95; 370/85; 370/104
[58] Field of Search ........................ 370/85, 89, 93, 95, 370/104

[56] References Cited

U.S. PATENT DOCUMENTS

| | | | |
|---|---|---|---|
| 3,647,975 | 3/1972 | Goto et al. | 370/93 |
| 4,063,220 | 12/1977 | Metcalfe et al. | 340/147 LP |
| 4,210,780 | 7/1980 | Hopkins et al. | 370/80 |
| 4,234,952 | 11/1980 | Gable et al. | 370/94 |
| 4,320,500 | 3/1982 | Barberis et al. | 370/60 |
| 4,332,027 | 5/1982 | Malcolm et al. | 370/94 |
| 4,337,465 | 6/1982 | Spracklen et al. | 340/825.03 |
| 4,380,761 | 4/1983 | Boggs | 340/825.5 |
| 4,395,710 | 7/1983 | Einolf, Jr. et al. | 340/825.5 |
| 4,408,300 | 10/1983 | Shima | 364/900 |
| 4,412,326 | 10/1983 | Limb | 370/85 |
| 4,476,467 | 10/1984 | Terwilliger et al. | 340/825.5 |
| 4,504,946 | 5/1985 | Raychaudhuri | 370/95 |
| 4,514,843 | 4/1985 | Albanese | 370/93 |
| 4,536,874 | 8/1985 | Stoffel et al. | 370/85 |
| 4,542,502 | 9/1985 | Levinson et al. | 370/88 |
| 4,543,574 | 9/1985 | Takagi et al. | 340/825.5 |
| 4,550,397 | 10/1985 | Turner et al. | 370/60 |
| 4,560,984 | 12/1985 | Scholl | 340/825.5 |
| 4,592,049 | 5/1986 | Killat et al. | 370/89 |
| 4,594,706 | 6/1986 | Kobayashi | 370/89 |
| 4,598,285 | 7/1986 | Hoshen | 340/825.5 |
| 4,612,637 | 9/1986 | Davis et al. | 370/95 |
| 4,641,304 | 2/1987 | Raychaudhuri | 370/93 |
| 4,677,615 | 6/1987 | Orimo et al. | 370/89 |

Primary Examiner—Salvatore Cangialosi
Attorney, Agent, or Firm—Allen LeRoy Limberg; William H. Meise

[57] ABSTRACT

In a communication system serving a plurality of transmitter-receivers, high capacity is achieved by asynchronous contention access of relatively short reservation request packets, which if successfully transmitted result in the scheduled, noncontention transmission of relatively long message data packets. In a first embodiment, the reservation request packets bear information relating to the duration of the message data packets, so that appropriate message data transmission time may be scheduled. Unsuccessful or colliding reservation request packets are retransmitted. In a second embodiment, the reservation requests packets do not include duration information, and the message data packets have fixed duration. In the second embodiment, collision resolution techniques allow the message data scheduling without retransmission of some colliding reservation request packets. It is also possible to operate in both modes, by scheduling random length message data transmissions as a result of noncolliding reservation request packets, and by scheduling fixed duration message data transmissions when reservation request packets collide.

18 Claims, 9 Drawing Sheets

CHANNEL OBSERVATION LOGIC FOR TIME-OF-ARRIVAL COLLISION RESOLUTION

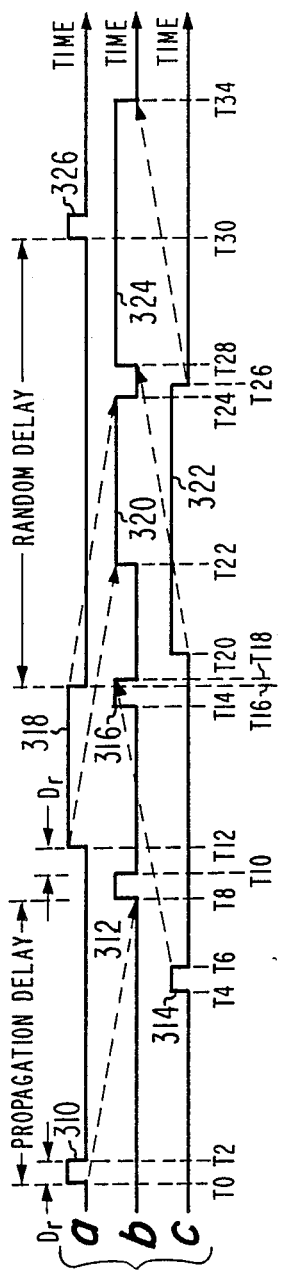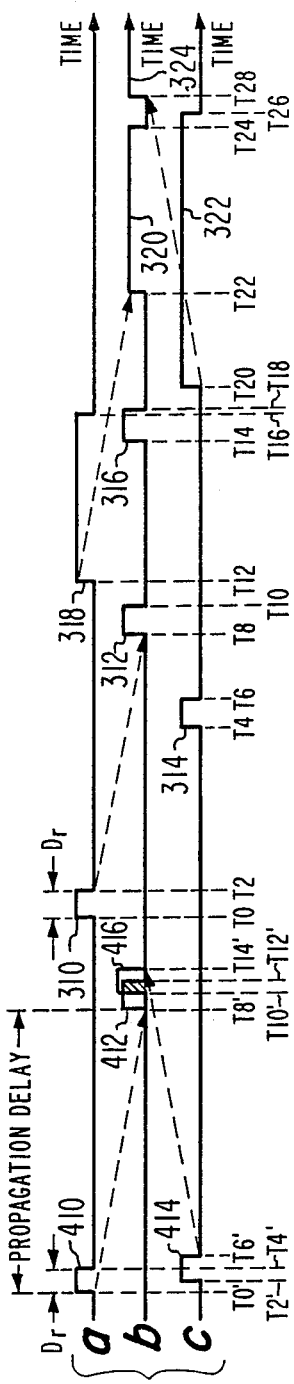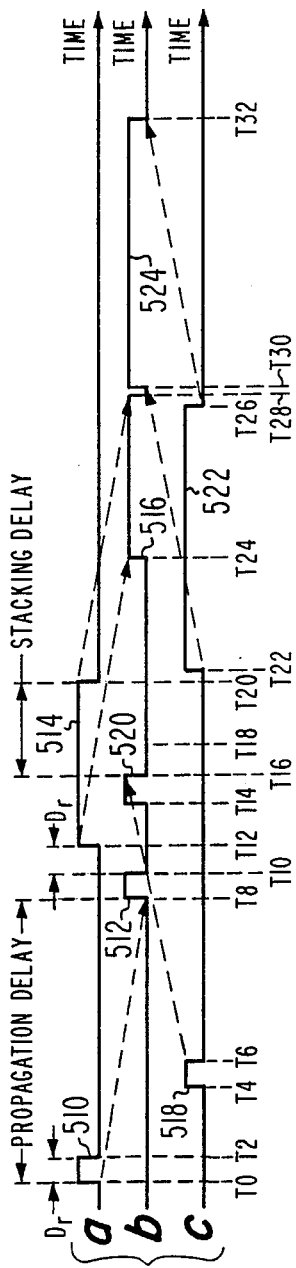

CHANNEL OBSERVATION LOGIC

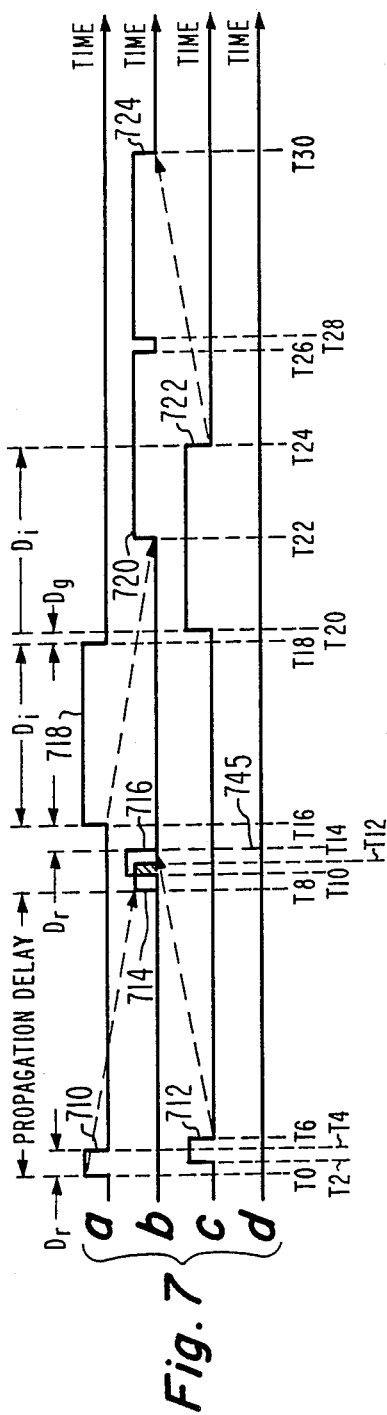
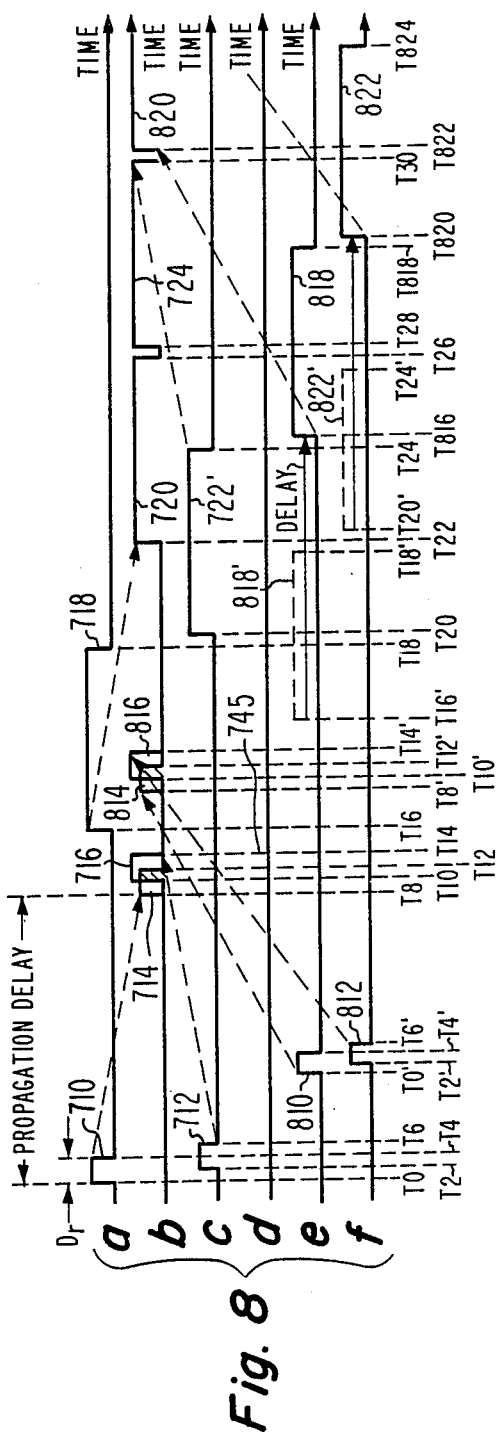
Fig. 7
Fig. 8

RANDOM ACCESS COMMUNICATION SYSTEM WITH SCHEDULED DATA TRANSMISSION AND ASYNCHRONOUS CONTENTION SCHEDULING

This invention relates to random access communication systems in which scheduling of data transmissions is accomplished by reservation request packets which contend on an asynchronous random access basis for transmission and which, when successfully transmitted, result in scheduled transmission of data packets.

BACKGROUND OF THE INVENTION

Many modern communication systems involve a number of geographically dispersed transmitter-receivers which communicate with each other by way of a high data rate transmission channel. The transmission channel may be a broadcast channel, a fiber optic cable or an electromagnetic transmission line, or it may include transmissions among a number of Earth station transmitter-receivers by way of the transponder of an Earth satellite. Economic considerations suggest that when the capital cost of a communications system is large, the capacity (the maximum throughput) of the system be as large as possible. Capacity is at a maximum, or 100%, when a single transmitter operates continuously and uses the communication channel or transmission path to address one or more receivers. When more than one transmitter must use the transmission path, a problem arises relating to scheduling the transmitters for maximum system capacity. If the transmitters which are to share the transmission path are physically near each other, a scheduler may be connected to each transmitter to uniquely establish a transmission time for each transmitter depending upon the amount of data to be transmitted, its importance or like considerations. When the geographic distance between the transmitters is large, and there is therefore a time delay between the signals leaving the scheduler and the time at which they arrive at the transmitters to be controlled, the scheduler may not be efficient in adapting to the changing conditions at each transmitter.

One approach to multi-access on such high propagation delay channels is to partition the channel time in a fixed, predetermined manner. Such systems are known as time division multiple access (TDMA) systems. They are efficient when the user population includes a few users having high duty cycles. Many modern systems provide communication among interactive data terminals, which operate in low duty cycle burst modes. Time division multiple access is not efficient in this context.

In response to the increasing need for communication over transmission paths having a time delay, schemes have evolved in which each transmitter-receiver (Tx/Rx) monitors the signal on the transmission path to determine whether the transmission path is active or idle, for scheduling transmissions during idle intervals. Because of the path delays, two or more transmitter-receivers might begin transmission at nearly the same time, unaware of each other's transmission. As a result, the transmission path would carry two or more signals simultaneously, causing a mutual interference known as a collision. Such collisions ordinarily make it impossible to correctly receive and decode the information carried by the signals. When the information is destroyed by a collision, it must be retransmitted. Many procedures or protocols have been devised for monitoring the transmission path and for scheduling transmissions and retransmissions in order to maximize capacity. Carrier sensing systems of this general sort have capacities in excess of 80%. U.S. Pat. No. 4,234,952 issued Nov. 18, 1980, to Gable, for example, stops or truncates the transmission of an information packet when interference is noted during transmission of that packet. Once a transmission has been in progress for the end-to-end propagation time of the transmission path, all transmitters other than the one transmitting are inhibited and the transmission is completed without collision.

The problems associated with TDMA and carrier sensing systems have led to contention protocols intended to more efficiently utilize a high propagation delay transmission path for low duty cycle communications among a large number of users. In general, contention systems allow any transmitter-receiver to transmit a message at will. In the event that two transmitter-receivers transmit at overlapping times, a collision occurs, as in the case of the carrier sensing systems with long propagation delays. Each transmitter-receiver must determine the existence of such collisions and respond by retransmitting the information. The ALOHA contention protocol is an asynchronous or unslotted system in which a plurality of remote stations are connected to a central station by a single transmission path. The various remote stations transmit complete packets of data over the transmission path. Collisions are resolved by retransmission at random times after the collision. The ALOHA system has a capacity of approximately 18 percent for low data rate transmissions. Thus, it has a relatively low maximum throughput due to the inefficiency associated with wasting the time of two transmission packets in the event of a slight overlap of packet transmission times.

Slotted or synchronous ALOHA is an improvement over simple ALOHA in which all transmissions occur in fixed non-overlapping time slots. By thus slotting or synchronizing transmissions, the vulnerable time for packet collision is reduced from a duration equal to two packet intervals to one packet interval, and the capacity therefore increases to 37%. The slotting requirement, however, increases the cost and complexity of the system. Also, both slotted and unslotted ALOHA are subject to further inefficiencies resulting from collisions of retransmitted packets.

A contention access protocol in which new transmissions are prevented from interfering with retransmissions provides up to approximately 49% capacity. This system is the Capetanakis tree algorithm, described in IEEE Transactions on Information Theory, September 1979, pp. 505-515, later refined by J. L. Massey and by R. G. Gallager. Tree algorithms achieve moderately high capacity on short propagation delay systems, but are not well suited to long propagation delay systems because the outcome of a slot transmission must be known before transmission on the next slot can begin.

A slotted contention access system entitled "Announced Retransmission Random Access (ARRA)" is described in U.S. patent application Ser. No. 873,446, filed June 6, 1986, in the name of Raychaudhuri, which is a continuation of Ser. No. 610,007 filed May 14, 1984 (now abandoned). The ARRA system pre-establishes the time at which a retransmission will occur in the event of a collision in a particular packet, and transmits this information together with the original packet in a manner which survives the collision. Thus, all transmitter-receivers are advised of the time at which retransmission will occur, and are programmed to inhibit transmission during that period. The ARRA system provides a capacity of approximately 53% for the less complex embodiments and as high as 60% in the more complex embodiments.

For some applications, the slotting or synchronization requirement of slotted ALOHA, Tree Algorithm Random Access or ARRA may be undesirable. An asynchronous contention access system entitled "Asynchronous Random Access Communication System With Collision Resolution Based On Time Of Arrival" is described in U.S. patent application Ser. No. 802,999 filed Nov. 29, 1985, in the name of Raychaudhuri. In this system, the data packets as transmitted have a fixed duration. When a collision occurs, at least that transmitter-receiver whose own packet was first among those colliding and that transmitter-receiver whose own packet was last among those colliding can retransmit their packets of data in a scheduled manner which avoids further collisions. Other embodiments extend this concept to scheduled retransmission of those packets which were first, second, penultimate and last among those colliding. This asynchronous system achieves a capacity of approximately 0.41 in the simpler embodiments and approximately 0.51 in the more complex embodiments. A contention access communication system is desired which is asynchronous and which provides high capacity with packets of random duration on a transmission path with long delay.

SUMMARY OF THE INVENTION

A system, apparatus and method for random access contention communication among a plurality of transmitter-receivers by way of a transmission path includes transmission means associated with each transmitter-receiver which is coupled to the transmission path and adapted for accepting information to be transmitted, for forming the information into at least one data packet. At least one reservation request packet is generated in association with each data packet. The reservation request packets may have uniform duration, and are transmitted at random times by way of the transmission path. The arrangement also includes a receiver associated with each transmitter-receiver and coupled to the transmission path for receiving its own reservation request packets and for also receiving other packets originating from other transmitter-receivers. A status determining arrangement is associated with each transmitter-receiver and is coupled to the associated receiver for identifying successful reception of the own reservation request packets. A control and scheduling arrangement is associated with each transmitter-receiver and is coupled to the associated status determining arrangement and to the transmitter for causing the transmitter to begin transmission of the data packet in response to successful reception of the own reservation request packet. Transmission begins at a time delayed from the successful reception of the own reservation request packet by at least a time equal to the duration of one of the reservation request packets. In another embodiment of the invention, the status determining arrangement establishes the successful reception of a reservation request packet originating from another transmitter-receiver, and the control and scheduling arrangement further inhibits all transmission from the transmitter for a selected additional time. In yet another embodiment of the invention, the reservation request packets identify the transmission duration of the associated data packet, so that the time during which other transmitter-receivers inhibit their transmitters may be preestablished. In still another embodiment, the duration of the data packets is uniform, and at least that transmitter-receiver whose reservation request packet was first in collision responds by transmitting its data packet at a predetermined time after the collision ends.

DESCRIPTION OF THE DRAWING

FIGS. 3a, 3b and 3c, referred to jointly as FIG. 3, are timing diagrams illustrating the time delay occurring between transmission by two Earth stations of FIG. 1 of reservation request packets, and successful reception of the corresponding signals by all transmitter-receivers, together with the scheduled transmission of data packets, in a system having a protocol according to a first embodiment of the invention in which the message data packet length is variable;

FIGS. 4a, 4b and 4c, referred to jointly as FIG. 4, are timing diagrams relevant to the first embodiment of the invention, illustrating partially concurrent transmission of two reservation request packets which results in a collision of the reservation request packets as received at the receivers, together with retransmission at a random time of further reservation request packets;

FIGS. 5a, 5b and 5c, referred to jointly as FIG. 5, are timing diagrams relevant to the first embodiment of the invention, illustrating scheduling of two data packets with "stacking" of the second data packet for transmission after completion of transmission of the first;

FIGS. 7a, 7b, 7c and 7d (referred to together as FIG. 7) are timing diagrams relevant to a second embodiment of the invention in which the message data packet length is fixed, illustrating the time delay occurring between transmissions by two Earth stations of FIG. 1 of reservation request packets, partially concurrent reception thereof resulting in collision, and scheduling of message data transmissions;

FIGS. 8a–8f, referred to jointly as FIG. 8, are timing diagrams relevant to the second embodiment of the invention, illustrating partially concurrent transmission of first, second, and third and fourth reservation request packets, and stacking of the resulting scheduled transmissions of message data packets;

DETAILED DESCRIPTION OF THE INVENTION

Figure 1:
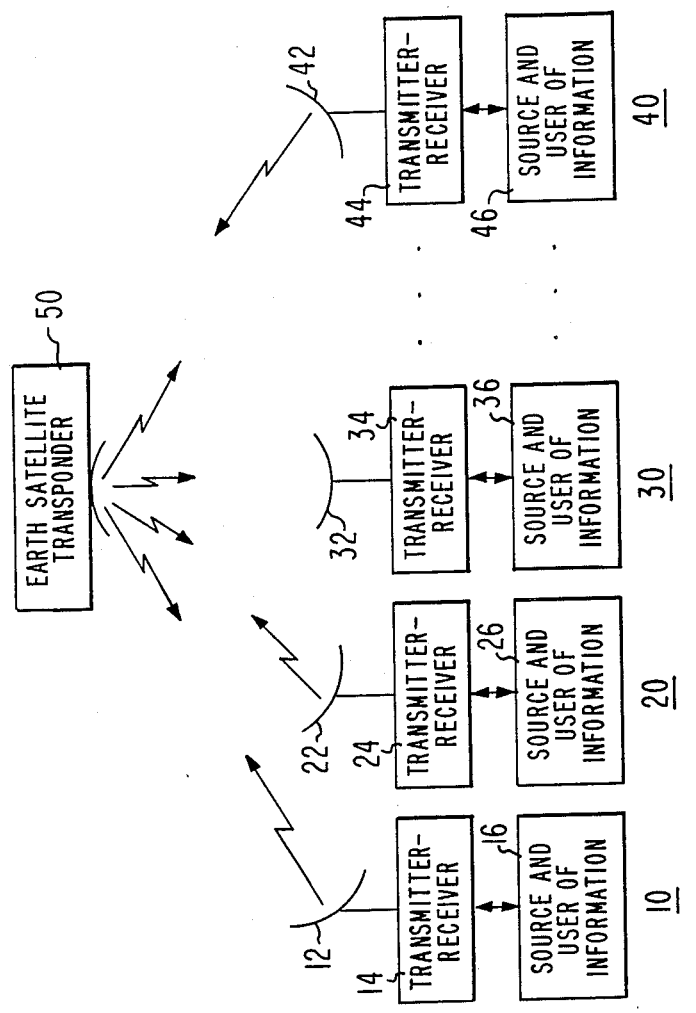
FIG. 1 is a block diagram of a communications system including a number of Earth stations, each including a transmitter-receiver and an associated source and user of information, each of which transmits to the transponder of an Earth satellite which retransmits received signals to all transmitter-receivers.

FIG. 1 is a block diagram of a communication system by which a number of Earth stations designated generally as 10, 20, 30 and 40 communicate among themselves by way of a transmission path including a transponder 50 at an Earth satellite. Earth station 10 includes an antenna 12, transmitter-receiver 14, and a source and user of information 16. Block 16 will ordinarily include a computer apparatus which is to communicate with the corresponding computers of other stations. Each of the other Earth stations, designated 20, 30 and 40, includes an antenna 22, 32, and 42; a transmitter-receiver 24, 34, 44; and a source and user of information 26, 36, and 46 respectively. All the Earth stations are identical, although each has a unique identifying address for identifying data addressed to it. As illustrated by arrows in FIG. 1, Earth stations 10, 20 and 40 are at the instant shown transmitting towards satellite transponder 50, which receives and retransmits the signals (ordinarily with a frequency translation) for reception by all of the Earth stations of the communications system, including Earth station 30. Transponder 50 is mounted on a satellite which is in a geostationary orbit, which establishes its altitude as 22,400 miles. The round-trip transmission path between a transmitter-receiver (Tx-Rx) and any other transmitter-receiver is therefore 44,800 miles. The round-trip delay for the transmission is approximately 0.25 second plus any retransmission delay in the transponder. The total delay is substantially greater than the duration of a low duty cycle information burst. Under such conditions, it is not possible for any transmitter-receiver to determine the current status of the sending end of the transmission path. The most current information available to any Tx/Rx relates to a condition which existed about 0.25 seconds earlier. Thus, it is not possible to delay transmission until the sending end is idle as in carrier sensing schemes, nor is it possible to truncate packets in response to a perceived collision.

Figure 2:
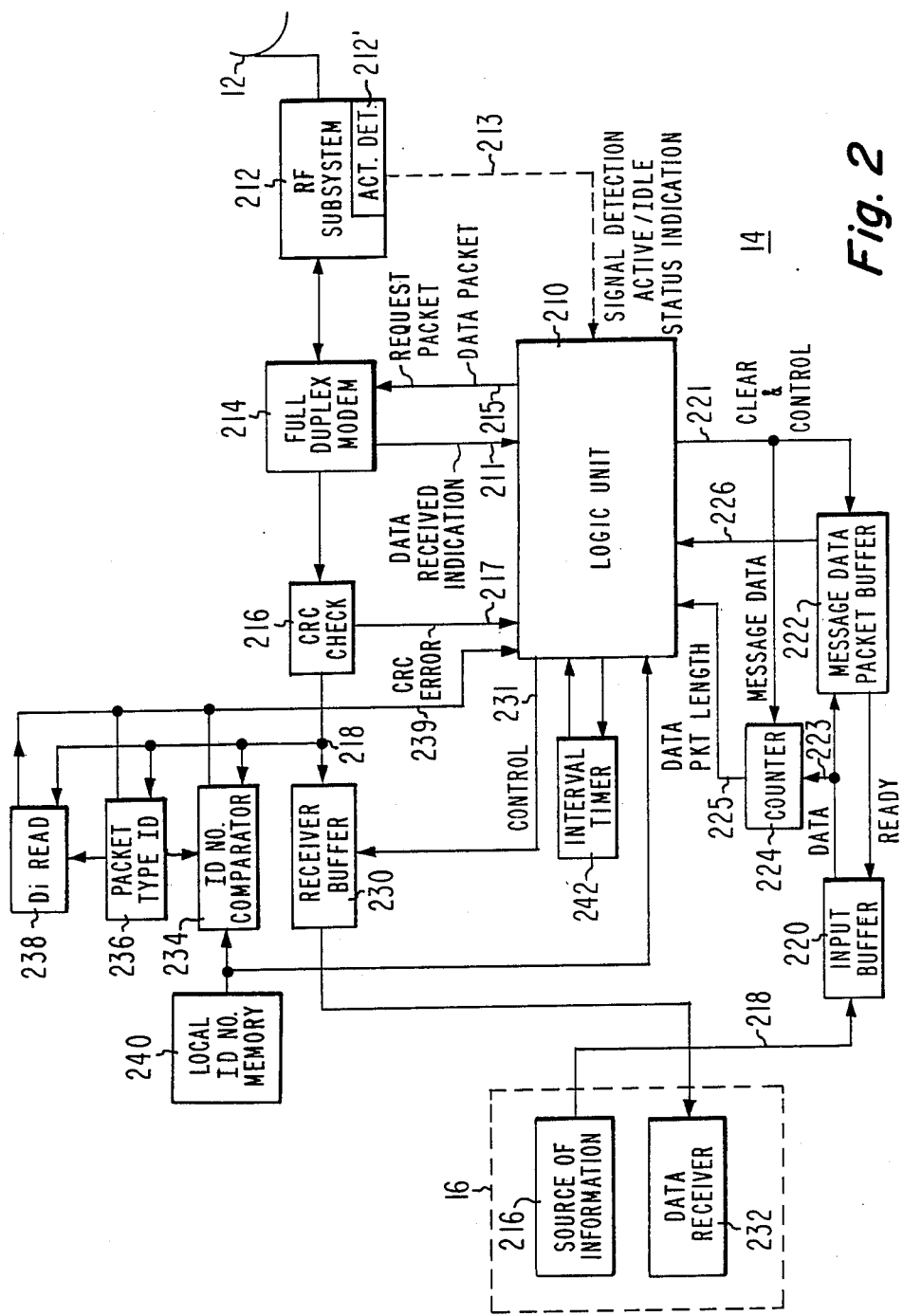
FIG. 2 is a simplified general block diagram of one of the Earth stations of FIG. 1.

FIG. 2 is a general block diagram of Earth station 10 of FIG. 1. Elements of FIG. 2 corresponding to those of FIG. 1 are designated by the same reference numeral. In FIG. 2, transmitter-receiver 14 receives information from a source of information 216, and encodes the information received from source 216 into a digital format if it is not already in digital form. Source of information 216 supplies the information over a conductor 218 to an input buffer 220 of transmitter-receiver 14. As known, the information may be in a form of serial data, in which case conductor 218 is a single conductor, or it may be supplied in parallel, in which case conductor 218 is a set including a plurality of conductors. Since this is well understood in the art, all conductor sets are hereafter described as through they were single conductors. Input buffer 220 receives the data and stores it until receipt of a READY signal produced by a message data packet buffer 222 when it is empty. Upon receipt of the READY signal, buffer 220 applies data to message data packet buffer 222 and to a counter 224 by way of a conductor 223. Counter 224 counts the number of bits being applied to message data packet buffer 222, and produces a signal on a conductor 225 representing the length of the data packet stored in message data packet buffer 222, for application to a logic unit or processor 210. Logic unit 210 is coupled to message data packet buffer 222 and to counter 224 by a conductor 221 for clearing of buffer 222 and counter 224, and for control thereof. Upon instructions from logic unit 210 to message data packet buffer 222 over conductor 221, buffer 222 applies the message data over a conductor 226 to logic unit 210.

Antenna 12 is connected to a radio frequency (RF) subsystem illustrated as block 212, which downconverts signals received by antenna 12 and demodulates the signals to baseband for application to a full duplex modem 214, and which also receives baseband signals to be transmitted from modem 214 and upconverts them for transmission by antenna 12. Modem 214 applies a signal to logic unit 210 over a conductor 211 during those times when data is being received. In its transmitting mode, modem 214 receives either a reservation request packet or a message data packet to be transmitted from logic unit 210 over conductor 215 as described in detail below. The demodulated signals received by modem 214 from RF subsystem 212 are applied to a cyclic redundancy check (CRC) unit illustrated as a block 216 for testing received signals for errors. CRC unit 216 produces a CRC valid/error signal which is applied by way of a conductor 217 to logic unit 210. If two or more signals are received concurrently or simultaneously, errors ordinarily occur in the demodulated data, which will result in an error signal from CRC unit 216 to logic unit 210.

Received data is applied by way of a conductor 218 from CRC unit 216 to a receive buffer 230, in which the received data is stored before being applied to the data receiving portion 232 of the source and user of information 16. Logic 210 controls buffer 230 over a control conductor 231. The data applied from CRC unit 216 to buffer 230 is also applied by conductor 218 to an address or identification number (ID) comparator 234, to a packet type identification unit illustrated as a block 236, and to a message data packet length ($D_i$) read unit 238. ID number comparator 234 continuously receives a signal from a logic address memory 240 which represents the address or identification number of the particular transmitter-receiver (in this case transmitter-receiver 14). Packet type identification unit 236 is coupled to $D_i$ read unit 238 for enabling read unit 238 to read the received data under certain circumstances, as described below. ID number comparator 234, packet type identification unit 236, and $D_i$ read unit 238 are coupled to logic unit 210 by a conductor 239 for applying packet information to logic unit 210. An interval timer illustrated as 242 is coupled to logic unit 210.

In operation, each identical transmitter-receiver of the system of FIG. 1, (identical except for their local address or ID number) asynchronously receives in its input buffer 220 message data generated for transmission by its associated source of information. Upon receipt of such message data to be transmitted, each transmitter-receiver by means of its counter 224 determines the length of the data packet to be transmitted, and forms a reservation request packet of short duration. The reservation request packet formed by a transmitter-receiver includes its own ID number, information relative to $D_i$, (the length of the data packet for which transmission or channel time is to be reserved) and includes parity bits or other overhead bits as required for cyclic redundancy check and housekeeping functions as well known in the art. Each reservation request packet so formed has a uniform predetermined length or duration ($D_r$) which is substantially shorter than the average length of the message data packet. The reservation request packet is transmitted on the channel by each transmitter asynchronously as soon as it has been generated. A random transmission time for the reservation request packet is guaranteed if the sources of information associated with the various transmitter-receivers are not synchronized. After a time delay equal to the round trip path delay to the satellite, all receivers of the system receive the reservation request packet transmitted by any one transmitter-receiver. Thus, each transmitter-receiver of the system receives its own ("own") reservation request packets and "other" reservation request packets which originate from other transmitter-receivers of the system. Assuming that a reservation request packet is received without collision with another reservation request packet, all transmitter-receivers other than that one which transmitted the reservation request packet (i.e. those receiving other reservation request packets) reserve time for transmission of the message data packet to be transmitted, by inhibiting their own transmitter for the particular reserved time. The reserved time begins after the time of completion of the reception of the reservation request packet, at a time delayed therefrom by the predetermined duration $D_r$ of one reservation request packet. This allows yet other reservation request packets which happened to be in the process of being transmitted at that time to be completed, before the beginning of message data packet transmission. Beginning $D_r$ (one reservation request packet duration) after the completion of reception of an other noncolliding reservation request packet reserving time having duration $D_i$, all transmitter-receivers (other than the one reserving time) inhibit their transmitters for a duration of $D_i$. During that inhibited period of duration $D_i$, that transmitter-receiver which reserved time transmits its message data packet in the duration $D_i$. Since all other transmitter-receivers are inhibited during the message data packet transmission, the message data packet is guaranteed to be received by all transmitter-receivers without collision. It should be noted that upon completion of reception of a noncolliding reservation request packet, initiation of transmission of new reservation request packets is also inhibited, until after completion of the message data packet for which time was reserved by the noncolliding reservation request packet, but any transmitter-receiver which had begun transmission of a reservation request packet before completion of reception of the noncolliding reservation request packet may complete its reservation request packet transmission during the delay of duration $D_r$ between the time of completion of reception of the noncolliding reservation request packet and the beginning of transmission of the corresponding message data packet.

In the event that a reservation request packet is not successfully received because of a collision with another reservation request packet, each transmitter-receiver which attempted to reserve time by a reservation request packet becomes aware of the failure to reserve time, and at a random time thereafter retransmits a reservation request packet containing the same information regarding $D_i$, ID, and the like.

FIG. 3 is a timing diagram or time line illustrating a possible sequence of events in a system according to the invention. The periods of transmission activity at a first transmitter-receiver, such as transmitter-receiver 14 of FIG. 1, are illustrated along the time line of FIG. 3a, and FIG. 3c represents the periods of transmission activity at another transmitter-receiver, such as transmitter-receiver 34 of FIG. 1. FIG. 3b represents the times of reception activity at all transmitter-receivers of the system (including transmitter-receivers 14 and 34) as a result of the transmissions represented by the waveforms of FIGS. 3a and 3c. In FIG. 3a, a waveform or pulse 310 has a duration extending from time T0 to time T2. Pulse 310 represents the transmission of a reservation request packet having a predetermined duration $D_r$ extending from time T0 to time T2. It should be noted that the amplitude of pulse 310 has no meaning, as FIG. 3 is only a time line. The reservation request packet represented by waveform 310 includes information relating to the duration of the associated message data packet for which time is being reserved (in this case, information relating to the time duration of the message data packet 318). After a propagation delay, the reservation request packet represented by pulse 310 is returned from the satellite and is received by all transmitter-receivers in an interval T8–T10, as represented by waveform or pulse 312 of FIG. 3b. The propagation delay is the time difference T8–T0. At time T10, all transmitter-receivers know that a message data packet having a particular duration will be transmitted beginning at a time $D_r$ after time T10, and respond by inhibiting transmissions for the interval T12–T16.

In some time interval T4–T6 earlier than T8–T10, another transmitter-receiver such as 34 transmitted a reservation packet illustrated as waveform 314 of FIG. 3c. This reservation request packet including information about the duration of the associated message data packet (322 of FIG. 3c). After the same propagation delay, the reservation request packet represented by waveform 314 is received by all transmitter-receivers, as represented by waveform 316 of FIG. 3b.

At time T16, all transmitter-receivers of the system know that they must reserve time T20–T26. Assuming that the reservation request packets 312 and 316 are received without collision, in accordance with the system protocol, that transmitter-receiver (14) which transmitted request packet 310 transmits the corresponding data packet beginning at a time T12, as illustrated by waveform 318 of FIG. 3a. Time T12 is delayed from the time of completion of reception of the reservation request packet by a time difference T10–T12, equal to $D_r$, as illustrated by waveform 312, for the purpose of avoiding the need to truncate reservation request packets already partially transmitted at time T10, which otherwise would collide with the data packet. As illustrated in FIG. 3a, data packet 318 has a duration which extends from time T12 until a time T16. Message data packet 318 is received by all transmitter-receivers after the system propagation delay in the interval T22–T24, as illustrated by pulse waveform 320 of FIG. 3b. The reception of message packet 320 is guaranteed to be collision free, because all transmitter-receivers other than the one transmitting message packet 318 (transmitter-receiver 14) are inhibited from transmission in the interval T12–T16.

As a result of successful or collision-free reception of reservation request packet 314 in the interval T14–T18 as represented by waveform 316 of FIG. 3b, in accordance with the system protocol, that transmitter-receiver which transmitted reservation request packet 314 (transmitter-receiver 34) waits for one reservation request packet duration $D_r$ (from time T18 until time T20) and then begins transmitting its message data packet at time T20, as illustrated by waveform 322 of FIG. 3c. The message data packet represented by waveform 322 is of random duration, so is illustrated as being longer than message data packet 318. The message data packet represented by waveform 322 is transmitted in the interval T20–T26. After a time interval equal to the propagation delay, the transmitted message data packet represented by waveform 322 is received by all transmitter-receivers in the interval T28–T34, as illustrated by waveform 324 of FIG. 3b. At a random time T30 following time T16 at which completion of transmission of data packet 318 was accomplished, the transmitter-receiver associated with FIG. 3a (transmitter-receiver 14) has received a further message to be transmitted, and transmits a further reservation request packet of duration $D_r$ illustrated as 326 of FIG. 3a, bearing information about the duration of a further message data packet (not illustrated) to be transmitted. Thus, the relatively long message packets 318 and 322 are transmitted in a scheduled fashion, free of collisions.

In the situation illustrated in FIG. 3, if packets 318 and 322 had simply been transmitted, without scheduling, at the times illustrated in FIGS. 3a and 3b, respectively, both would have been successfully received since they were not transmitted at overlapping times. However, if asynchronous and unscheduled transmission of data packet 322 had begun at a time between time T14 and T16, for example, instead of at time T20 as illustrated, the corresponding received packets 320 and 324 of FIG. 3b would have overlapped slightly, resulting in the destruction of at least some packet information. Since the importance of the destroyed information cannot be assessed, both packets 318 and 322 would have required retransmission. This would result in the waste of an amount of channel transmission time nearly equal to the sum of the durations of packets 318 and 322.

FIGS. 4a, 4b and 4c are time lines or timing diagrams similar to those of FIGS. 3a, 3b and 3c, in which a collision occurs between reservation request packets. In FIG. 4a, waveform 410 represents transmission of a reservation request packet from a first transmitter-receiver (such as transmitter-receiver 14) in the interval T0'–T4'. As in the case of FIG. 3, the interval T4'–T0' is the duration $D_r$ of a reservation request packet. The reservation request packet represented by waveform 410 bears information about the duration of the associated message data packet (packet 318). After a propagation delay of T0'–T8', the reservation request packet represented by waveform 410 is received by all transmitter-receivers in the interval T8'–T12' as illustrated by waveform 412 of FIG. 4b. A second transmitter-receiver (such as 34) begins transmitting its own reservation request packet in the interval T2'–T6', as illustrated by waveform 414 of FIG. 4c. Both transmitter-receivers 14 and 34 (and all other transmitter-receivers) transmit their reservation request packets at random times, because none of them know what is happening at the transmitting end of the transmission path (except at their own location). Thus, neither transmitter-receiver 14 nor 34 can know that they are transmitting simultaneously in the interval T2'–T4', and this will not become apparent until the reservation request packets are received in the interval T8'–T14'. All transmitter-receivers receive reservation request packet 414 in the interval T10'–T14', as illustrated by waveform 416 of FIG. 4b. As mentioned, the amplitude of the waveforms of time lines such as those of FIG. 4 is not meaningful, and waveform 416 is illustrated as being larger than waveform 412 solely to make their time relationship evident. Reservation request packets 410 and 414 transmitted by the first and second transmitter-receivers are received simultaneously by all transmitter-receivers of the system in the interval T10'–T12', as illustrated by the overlap of waveforms 412 and 416 of FIG. 4b. This overlap destroys data relating to the reservation requests. As a result, it is not possible to reliably schedule data packets from the information contained therein. The errors will result in the message not being recognized by the transmitter-receivers of the system, and the CRC unit will indicate that the message is erroneous. Thus, the transmitter-receivers of the system do not reserve transmission time. The first and second transmitter-receivers still have message data to be transmitted, and in accordance with the system protocol each selects a random time at which to retransmit its reservation request packet. The first transmitter-receiver selects a random time T0–T2 in which to retransmit its reservation request packet, as illustrated by waveform 310 of FIG. 4a. The second transmitter-receiver selects another random time T4–T6 in which to retransmit its reservation request packet, as illustrated by waveform 314 of FIG. 4c. The waveforms of FIGS. 4a, 4b and 4c after the time T0 are identical to the corresponding waveforms of FIG. 3, and result in scheduled transmission of data packets 318 and 322, which are received without collision by all transmitter-receivers as received data packets 320, 324, all as described in conjunction with FIG. 3. A major advantage of the system according to the invention and its protocol lies in that the time wasted as a result of unsuccessful transmissions is attributable solely to collisions among the relatively short duration reservation request packets, rather than to collision among relatively long message data packets, thereby resulting in a high capacity partially asynchronous system.

FIG. 5 includes timing diagrams illustrating the transmitting activity at first (14) and second (34) transmitter-receivers in a stacking situation. A stacking situation is one in which a second scheduled transmission is delayed to allow time for completion of an earlier scheduled transmission which, in the absence of a delay of the second transmission, would result in an overlap or simultaneous occurrence of the transmissions. As mentioned, simultaneous transmission results in simultaneous reception in such a single-channel system, which, in turn, may result in loss of data. In FIG. 5a, waveform 510 represents transmission by a first transmitter-receiver (14) of a reservation request packet having a duration $D_r$ extending from time T0–T2, which packet includes information relating to the duration of the associated message data packet (packet 514). After a propagation delay of T0–T8, the reservation request packet is received by all transmitter-receivers, as illustrated by waveform 512 of FIG. 5b in the interval T8–T10. Since this reservation request packet is received without collision, the first transmitter-receiver waits for a time period equal to the duration $D_r$ of one reservation request packet, which is until time a T12, and then transmits the corresponding message data packet in an interval T12–T20, as illustrated by waveform 514 of FIG. 5a. All other transmitter-receivers of the system receiving the reservation request packet represented by waveform 512 inhibit their transmissions in the interval T12–T20. After the system propagation delay, the message data packet represented by waveform 514 is received by all transmitter-receivers of the system in the interval T24–T28, as illustrated by waveform 516 of FIG. 5b. The message data packet represented by waveform 516 is received without collision, as guaranteed by the system protocol.

A second transmitter-receiver of the system (such as transmitter-receiver 34) transmits a reservation request packet in an interval T4–T6, as illustrated by waveform 518 of FIG. 5c. This reservation request packet happens to be transmitted at a time when no other transmissions are occurring, and is received by all transmitter-receivers without collision in an interval T14–T16, as illustrated by waveform 520 of FIG. 5b. If the second transmitter-receiver merely began transmitting its message data packet at time T18, which is one reservation request packet duration $D_r$ following time T16, the message data packet transmitted by the second transmitter-receiver would collide with the message data packet transmitted by the first transmitter-receiver (illustrated as 514) which is received by all transmitter-receivers as 516. This problem is solved by causing the second transmitter-receiver (34) to begin its transmission of the message data packet after a stacking delay equal to the difference between the time T16 at which all transmitter-receivers complete reception of reservation request packet 520 and the time (T20) at which transmission of the message data packet currently being transmitted (packet 514) is completed. Furthermore, all other transmitter-receivers continue their already scheduled period of inhibition (T12–T20) by the actual duration $D_i$ of the message data packet associated with received reservation request packet 520. A small additional guard delay is added to guarantee that there will be no interference between message data transmissions. The guard delay is T20–T22. Consequently, the second transmitter-receiver (34) begins transmission of its message data packet (522 of FIG. 5c) at a time T22, delayed from time T18. Message data packet 522 is received by all transmitter-receivers in an interval T30–T32, as illustrated by waveform 524 of FIG. 5c. The guard delay between received message data packets 516 and 524 is illustrated as the interval T28–T30. The stacking feature not only prevents collisions under certain circumstances, but also actually increases throughput at higher channel loading by eliminating some of the delays $D_r$ between the time of reception of a reservation request packet and the transmission of the associated message data packet.

Figure 6A:
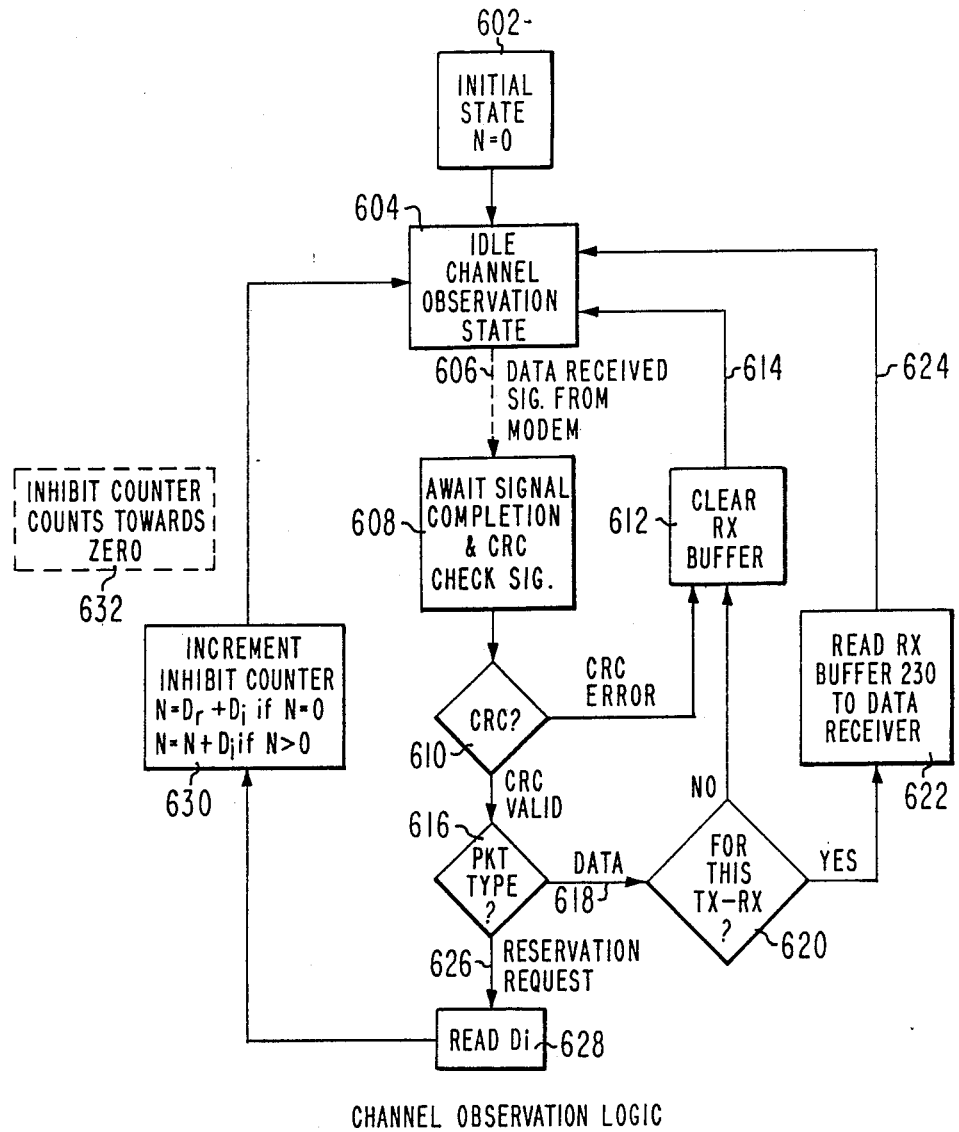
FIGS. 6a and 6b (referred to together as FIG. 6) are flow charts illustrating channel observation logic flow and transmission control logic flow functions, respectively, of logic unit 210 of FIG. 2 to provide asynchronous reservation and scheduling of data packet transmission as illustrated in FIGS. 3 and 4, and stacking as illustrated in FIG. 5.
Figure 6B:
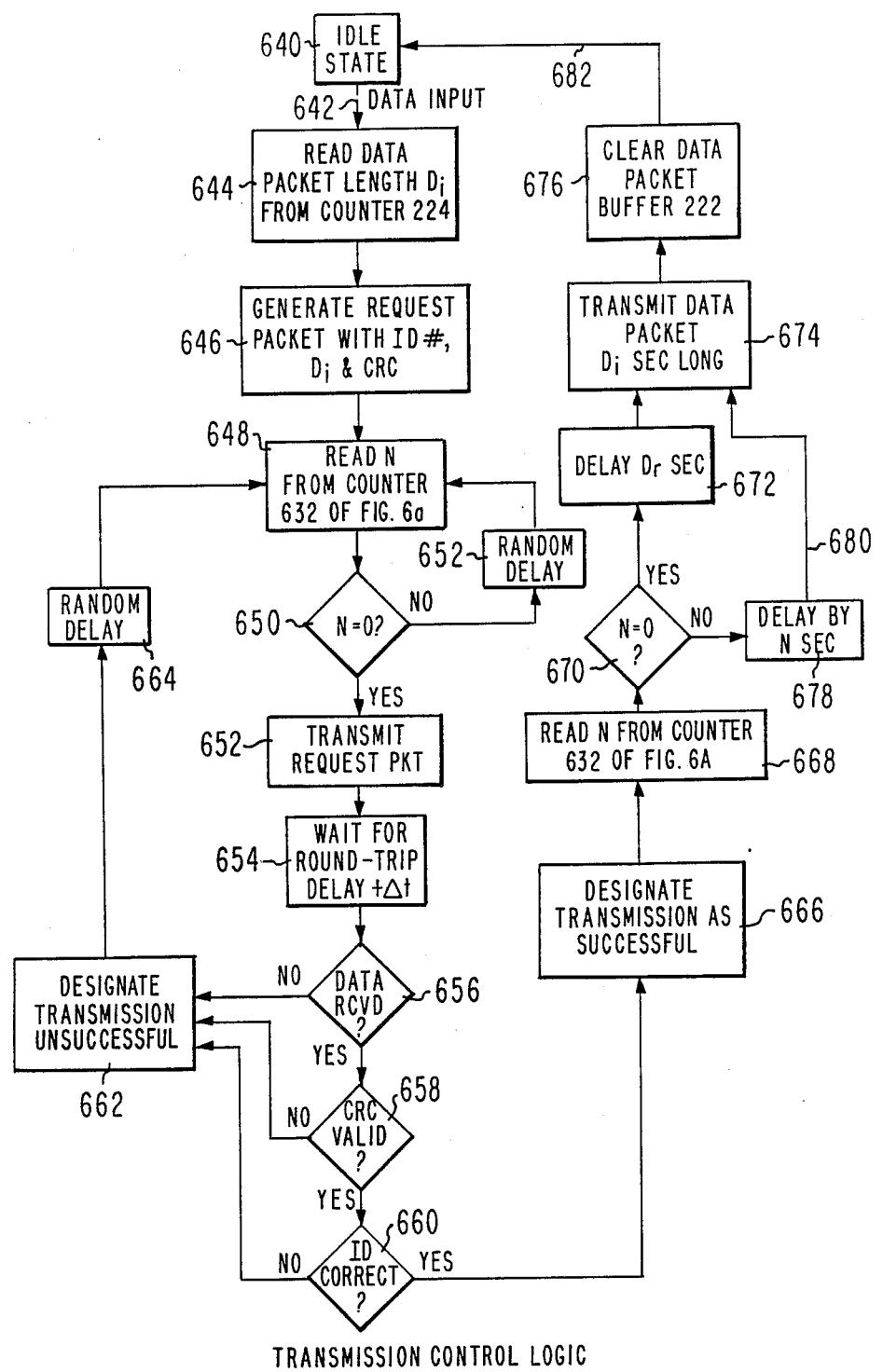

FIGS. 6a and 6b together represent in simplified form the logic flow required in logic unit 210 of FIG. 2 in order to accomplish asynchronous reservation request scheduling of message data packets of random duration as described in conjunction with FIGS. 3, 4 and 5. Logic unit 210 concurrently runs through two program loops, a first (FIG. 6a) for evaluating the status of the receiving end of the channel, and a second (FIG. 6b) for control of reservation request packet transmission and retransmission as necessary, and for transmission of message data packets in response to successful scheduling. Thus, logic circuit 210 includes a pair of cooperating microprocessors, or a single microprocessor appropriately multiplexed. In the logic flow diagram of FIG. 6, operating states are illustrated by rectangles and decision points by diamonds. Fixed or noncontingent (sequential) flow paths are indicated by solid lines, and paths which are contingent upon events which are extrinsic to logic unit 210 are indicated by dotted lines.

In FIG. 6a, the initial program state is illustrated as a block 602. The letter N represents the unexpired inhibited period or period during which transmissions are forbidden. In this initial state, N is zero. Block 602 is coupled to a block 604 representing an idle channel observation state in which no transmissions are received. The state represented by block 604 continues until a DATA RECEIVED signal is received by logic unit 210 over conductor 211 (FIG. 2). The logic then proceeds by extrinsic or interrupt path 606 to a block 608, which represents activation of an interval timer contained in interval timer block 242 of FIG. 2. Since a signal is being received, the cyclic redundancy check performed by block 216 of FIG. 2 will produce a signal on conductor 217 indicative of a valid error free signal, or it will indicate an error. At the end of the delay represented by block 608, the CRC error signal is evaluated by logic 210, as represented by a decision block 610 (FIG. 6a). If the CRC signal indicates an error, thereby representing the result of a collision, the logic flows from decision block 610 to a block 612, which represents the clearing of receive buffer 230 of FIG. 2 to eliminate the erroneous received signal stored therein. The logic then flows from block 612 by a path 614 back to the idle channel observation state represented by block 604.

Assuming that a valid signal is received, the logic flows from decision block 610 to a decision block 616, which evaluates the signal from packet type identification block 236 of FIG. 2. If the packet is a data packet, the logic flows by a path 618 (FIG. 6b) to a further decision block 620, which examines the signal from ID number comparator 234 (FIG. 2). If the data is not intended for or addressed to the particular transmitter-receiver which receives it, the logic flows by the NO output of decision block 620 to block 612, which represents clearing of the received signal from receive buffer 230 (FIG. 2). If the data is for the transmitter-receiver, the logic flows by the YES output of decision block 620 to a further block 622 which represents reading of receive buffer 230 to the data receiver 232. This represents completion of the reception of a data signal and the logic thereupon flows by path 624 back to the idle channel observation state represented by block 604.

On the other hand, if the valid received packet was a reservation request packet rather than a data packet, the logic flows from decision block 616 (FIG. 6a) by a path 626 to a block 628 representing the reading from block 238 of FIG. 2 of the duration ($D_i$) of the message data packet for which time is being reserved. The logic then flows to a block 630 which represents the incrementing of an inhibit counter internal to logic unit 210 of FIG. 2. The inhibit counter is represented by dotted block 632 of FIG. 6a. Counter 632 continually counts towards zero at a clock rate. Its current content is designated N, and may be thought of as having the units of seconds. In block 630 of FIG. 6a, inhibit counter 632 is incremented to a new value of N equal to $D_r + D_i$ if N is initially 0, and is incremented to a new value of N equal to the prior value of N plus $D_i$ if N is initially greater than 0. Thus, if the transmitter is not currently being inhibited, (if N is 0) the inhibit counter is set to the sum of the duration of one reservation request packet ($D_r$) plus the duration of the message data packet for which time is being reserved ($D_i$). This represents the condition illustrated in FIG. 3 for either transmitter. On the other hand, if the transmitter is inhibited (N>0) at the time that the logic reaches block 630, this must mean that a transmitter-receiver somewhere in the system is currently transmitting a signal, and therefore the period of inhibition should merely be increased or incremented by the length of the message data packet for which time is being reserved. The logic flows from block 630 back to the idle channel observation state represented by block 604. The contents (N) of inhibit counter 632 are used in the logic flow illustrated in FIG. 6b for control of the transmission.

FIG. 6b is a logic flow chart illustrating the transmission control logic flow occurring in logic unit 210 of FIG. 2 essentially simultaneous with the channel observation logic flow of FIG. 6a. In FIG. 6b, the idle state is represented by a block 640. The logic remains in the idle state until such time as packet buffer 222 of FIG. 2 is loaded with a packet of message data to be transmitted. The presence of data in packet buffer 222 causes the logic to flow by interrupt data input path 642 (FIG. 6b) to a block 644, representing the reading of the message data packet length ($D_i$) from counter 224 (FIG. 2). The logic then flows in sequence to block 646 (FIG. 6b) which represents generation of the reservation request packet including the particular identification number of the transmitter-receiver and also including the length $D_i$ of the associated message data packet. The logic then flows in sequence to a block 648, which represents the reading of the remaining inhibit period N from counter 632 of FIG. 6a, and then flows to decision block 650. If N is greater than zero, the NO output of decision block 650 returns the logic by way of a random delay illustrated as a block 652 to block 648. This prevents transmission of a reservation request packet during a period of inhibition, which corresponds to a time at which some other transmitter-receiver has scheduled time for its own message data transmission. Eventually, the period of inhibition will end, and N will become zero. When N=0, no other transmitter-receiver has scheduled a message data transmission, although asynchronous or unscheduled reservation request packets may be transmitted. At some time thereafter, the logic will flow from decision block 650 by the YES output to a block 652, which represents transmission of the reservation request packet to modem 214 (FIG. 2), and to RF subsystem 212 for transmission over the transmission path to all transmitter-receivers. The logic (FIG. 6b) then flows in sequence to a block 654, which represents a delay equal to the round trip delay through the transmission path (plus a small additional time to take into account possible system timing inaccuracies). The logic then flows in sequence to three decision blocks, 656, 658 and 660, in which the DATA RECEIVED signal on conductor 211 (FIG. 2) is examined to verify reception, the CRC signal on conductor 217 (FIG. 2) is examined for an error-free transmission, and the identification number of the received packet is checked to verify that it is the one which was transmitted. A NO output from any one of decision blocks 656, 658 or 660 causes the logic to flow to a block 662 representing designation of the reservation request packet as unsuccessful, and the logic then flows by a random delay illustrated as a block 664 back to block 618.

If, on the other hand, the transmitted packet is received with its CCC code intact, and with the correct identification number, the YES output of decision block 660 directs the logic to a block 666 which represents designation of the reservation request transmission as successful. At this point, in the absence of the stacking feature, it would merely be necessary to delay by $D_r$, the duration of a reservation request packet, and to thereafter transmit the message data packet. The delay by $D_r$ is represented by block 672, and the transmission of the message data packet is represented by block 674. However, the path including blocks 672 and 674 is taken only in the event that there is not a remaining period of inhibition represented by a finite value of N in inhibit counter 632 of FIG. 6a. The path between blocks 666 and 672 therefore includes a further block 668 which represents the reading of N from counter 632 of FIG. 6a, followed by a decision block 670 which compares the the value of N with zero. If the value of N is zero, the logic flows by the YES output of decision block 670 to delay 672 and to block 674. Once the transmission has been accomplished, packet buffer 222 and counter 224 (FIG. 2) are cleared, as represented by block 676. The logic then returns by path 682 to the idle state represented by block 640.

The stacking feature is provided by a logic path including the NO output of decision block 670, by which path the logic flows through a block 678, which represents a delay equal to N, which is a delay equal to the unexpired period of inhibition. The logic flows from block 678 by a path 680 to block 674, representing transmission of the message data packet, and to block 676 (clearing of the buffer) and by path 682 to the idle state represented by block 640.

As so far described, the system according to the invention is subject to a minor inefficiency in that a collision among reservation request packets results in a retransmission of the reservation request packets until such time as they are received collision-free. In effect, this results in the "waste" of possibly useful system channel transmission during those intervals in which it is occupied by colliding reservation request packets. It would be very desirable to be able to schedule one or more message data packets even if two or more reservation request packets collide. In another embodiment of the invention, noncolliding reservation request packets result in scheduled transmission of message data packets, as illustrated in FIG. 3 (except for the fact that, as described below, the message data packets are of fixed duration). Stacking of scheduled transmissions occurs as illustrated in FIG. 5 (again, differing only in that the message data packets are of fixed duration). FIG. 7 includes time diagrams of transmission activity at first and second transmitter-receivers, and reception activity at all transmitter-receivers of a system according to this other embodiment of the invention.

FIG. 7a illustrates a waveform 710 representing transmission by a first transmitter-receiver of the system (such as 14 of FIG. 1) of a reservation request packet having duration $D_r$ in an interval T0–T4. A second transmitter-receiver, such as transmitter-receiver 34 of FIG. 1, transmits a reservation request packet also having duration $D_r$ in an interval T0–T6, as represented by waveform 712 of FIG. 7c. Unlike the reservation request packets previously discussed, reservation request packets 710 and 712 do not carry information relating to the duration of the associated data packet. As described below, the message data packet duration is invariant and therefore known to all transmitter-receivers. As in the case previously discussed, none of the transmitter-receivers can know the status of the sending end of the transmission path, so overlap of the asynchronous reservation request packets is likely to occur. After a propagation delay, the reservation request packet (710) transmitted by the first transmitter-receiver is received by all transmitter-receivers of the system in the interval T8–T12, as illustrated by waveform 714 of FIG. 7b. After the same propagation delay, the reservation request packet (712) transmitted by the second transmitter-receiver is received by all transmitter-receivers of the system in an interval T10–T14, as illustrated by waveform 716 of FIG. 7b. As mentioned previously, the amplitude of colliding reservation request packets represented by waveforms 714 and 716 is not meaningful, and is intended merely to allow illustration of the different packets. The leading edge of received reservation request packet 714 arrives at all receivers at the time T8, later than time T0 at which it was transmitted. The time difference between times T0 and T8 is the round-trip propagation delay from antenna 12 (FIG. 1) to transponder 50, and back to any of antennas 12, 22, 32 and 42. Similarly, time T12 at which the lagging edge of packet 714 arrives at the receivers follows time T4 at which it was transmitted by Earth station 10 by a time equal to the propagation delay. The leading and lagging edges of received reservation request packet 716 at times T10 and T14 also follow by the same propagation delay times T2 and T6 at which the leading and lagging edges, respectively, of reservation request packet 712 were transmitted. The interval T10–T12 represents a collision portion of the packets, and is shaded in FIG. 7b to represent the loss of the information contained in the packets. According to an aspect of the invention, each transmitter-receiver monitors the receive end of the transmission path at its own Earth station to determine whether its own transmitted reservation request packet was the first or last involved in the collision. Each transmitter-receiver is programmed with information relating to the round-trip propagation time from its transmitter to its receiver by way of the transmission path. This information may be precalculated or based upon experiment. Each transmitter-receiver determines whether the receiving end of the transmission path is active or idle immediately before and immediately after the anticipated or expected time of reception of the leading and lagging edges, respectively, of its own reservation request packet. For example, transmitter-receiver 14 of Earth station 10 monitors at its receiver during a small time window near time T8 to determine whether it receives signals immediately before time T0 (FIG. 7b) at which it expects the leading edge of its own reservation request packet 714 to be received, and it also monitors the transmission path during a small time window near time T12 at which the lagging edge of its own reservation request packet 714 is expected, to determine if the transmission path is active or idle immediately after receipt of its own reservation request packet. As illustrated in FIG. 7b, transmitter-receiver 14 finds that the receiving end of the transmission path is idle immediately before time T8, since no signals are being received. Immediately after the end of the reception of its own reservation request packet at time T12, however, transmitter-receiver 10 finds that signals are still being received. These signals are from other packet 716 which originated as packet 712 from Earth station 30. With this information, transmitter-receiver 14 can establish with reasonable assurance that its own reservation request packet was involved in a collision, since the period of continuous activity on the transmission path as received exceeds one reservation request packet duration, and it can also establish that its own reservation request packet 714 was the first or earliest to occur among the packets involved in the collision, because there was no activity on the transmission path prior to the expected time of arrival of its own packet. Transmitter-receiver 14 cannot determine the source of the other packets involved in the collision, nor the number of other packets involved in the collision.

Transmitter-receiver 34 of Earth station 30 also monitors the receiving end of the transmission path, but finds that the transmission path was active immediately before time T10 (the time at which the leading edge of its reservation request packet 716 returns), and that the transmission path is idle immediately after time T14. From this information, transmitter-receiver 30 also establishes that a collision has occurred. Transmitter-receiver 30, however, determines that its received packet 716 was the last among those involved in the collision, because the transmission path is idle immediately after time T14 at which the lagging edge of its own packet was expected to arrive. All other transmitter-receivers of the system, represented by transmitter-receivers 24 and 44 of FIG. 1, also know that a collision has occurred in the received reservation request signals, because the period of continuous activity on the transmission path exceeds the duration of one packet, and they also know that their own reservation request packets were not involved in the collision, because none of their own reservation request packets had scheduled arrival times occurring within interval T8–T14 of FIG. 7. No transmitter-receiver of the system knows how many reservation request packets were involved in the collision, because the time T8–T14 could encompass several substantially simultaneous reservation request packet durations. Any transmitter-receiver of the system other than transmitter-receivers 14 and 34 which expected receipt of its own reservation request packet in the interval T8–T14 found that the channel was active both prior to and after the expected times of arrival of the leading and lagging edges of its own reservation request packet, so that it is neither first nor last in collision.

In accordance with an aspect of the invention, all transmitter-receivers of the system respond to successful or noncolliding reception of a reservation request packet by inhibiting new reservation request packets and other transmissions for an interval equal to the sum of $D_r$ (the duration of a reservation request packet) plus $D_i$ (the duration of a message data packet, which is uniform at all times and for all transmitter-receivers of the system). Any transmitter-receiver which began transmission of a reservation request packet prior to completion of successful reception of a reservation request packet may, however, complete the transmission. That transmitter-receiver which receives its own noncolliding reservation request packet waits for a period equal to $D_r$, and then transmits its own message data packet of fixed duration $D_i$. The message data packet is guaranteed successful reception, because all other transmitter-receivers also received the noncolliding reservation request packet, and are inhibited from transmission during the period in which the corresponding message data packet is transmitted.

According to a yet further aspect of the invention, in the event of a collision among two or more reservation request packets, that transmitter-receiver whose own reservation request packet was first among those colliding waits for an interval equal to $D_r$ after cessation or completion of reception activity, and transmits its own fixed duration message data packet. That transmitter-receiver whose own reservation request packet was last among those colliding waits for a period after completion of reception activity equal to the sum of $D_r$, plus $D_i$, plus a short guard interval ($D_g$) if desired, and then begins transmission of its fixed duration message data packet. All transmitter-receivers of the system other than those transmitting the first and last reservation request packets among those colliding inhibit transmissions after completion of reception activity on the transmission path for a period equal to the sum of $D_r$ plus two intervals of $D_i$ (plus the guard interval $D_g$, if desired). Thus, a collision among reservation request packets allows scheduling of two message data transmissions without retransmission of the first and last reservation request packets from among those colliding. As described so far, transmitter-receivers 14 and 34 have their own reservation request packets involved in the collision, and transmitter-receivers 24 and 44 do not have their own reservation request packets involved in the collision. Other reservation request packets among those colliding which are neither first nor last must be retransmitted by their originating transmitter-receivers at a random time following the period of inhibition. As illustrated in FIG. 7a, a message data packet illustrated as a waveform 718 is transmitted by transmitter-receiver 14, whose received reservation request packet 714 (FIG. 7b) was first among those colliding. The transmission of message data packet 718 begins at a time T16, delayed from time T14 by $D_r$, the duration of a reservation request packet. Time T14 is the time at which reception activity relating to the colliding reservation request packets ceases at all receivers. Message data packet 718 has duration $D_i$, and is received by all transmitter-receivers of the system in the interval T22–T26, as illustrated by waveform 720 of FIG. 7b. A short guard interval T18–T20 is illustrated, after which transmitter-receiver 34 transmits its own message data packet in the interval T20–T24, illustrated as 722 of FIG. 7c. Thus, transmission of message data packets illustrated by waveforms 718 and 722 do not overlap in time, and result in reception of the corresponding message data packets in nonoverlapping intervals T22–T26 and T28–T30 respectively, as illustrated by waveforms 720 and 724 of FIG. 7b. The transmitter-receivers of the system schedule transmission of message data packets 718 and 722 in spite of collision of the reservation request packets 710 and 712 in a manner which avoids the need for retransmission of the reservation request packets and which avoids collision of the message data packets and therefore guarantees successful reception. This is accomplished by a retransmission protocol established for each transmitter-receiver which, for transmitter-receivers other than those whose reservation request packets are involved in the collision, inhibits initial transmission of new packets for a predetermined time after cessation of activity at the receiver. This period without transmissions is an inhibited or idle time, as described above in relation to the embodiments of FIGS. 2 through 6.

As mentioned in conjunction with FIG. 7, reception activity ceases at all transmitter-receivers for an interval after time T14. Each transmitter-receiver produces a time marker at time T14 such as that conceptually illustrated as 745 in FIG. 7d and counts period $D_r$ plus a predetermined number of packet durations after time marker 745 (plus a guard time, as mentioned). As illustrated in FIG. 7, an interval $D_r$ after time marker 745 expires at time T16. A period of one packet duration plus $D_r$ expires at time T18, and a time period equal to $D_r$ plus two packet durations $D_i$ plus a guard interval expires at a time T24. The interval of $D_r$ after time marker 745, extending from time T14 until time T16, is a time in which new transmissions are inhibited to allow for completion of reservation request packet transmissions which have already started. Such a transmission could occur if a transmitter-receiver of the system other than transmitter-receivers 14 and 34 randomly selected time T14 (FIG. 7) to begin transmission of a reservation request packet. Since all reservation request packets have the same duration, the transmitted reservation packet (not illustrated in FIG. 7) is guaranteed the interval T14–T16 for completion of transmission by idling or preventing new transmissions from any other transmitter-receiver. Beginning at time T16, $D_r$ after the time marker at time T14, transmitter-receiver 10 (whose own received reservation request packet 714 was first in the collision) begins transmission of fixed duration message data packet 718 of FIG. 7a as illustrated in the interval T16–T18. Since all other transmitter-receivers are required by the system protocol to be idle (not transmit) in the interval T16–T18, packet 718 is received as packet 720 of FIG. 7b by all transmitter-receivers in the interval T22–T26, without interference or collision with other packets. Also in accordance with the system protocol, transmitter-receiver 34, whose received reservation request packet 716 of FIG. 7b was last in collision, transmits its message data packet 722 of FIG. 7c beginning at time T20 ($D_r$ plus $D_i$ after the time marker at time T16) and ending at a time T24 ($D_r$ plus $D_i$ plus $D_g$ after time marker 745). Message data packet 722 is received by all the transmitter-receivers of the system beginning at a time T28 and ending at a time T30, as illustrated by packet 724 of FIG. 7b. As illustrated in FIG. 7b, message data packets 720 and 724 are received by all transmitter-receivers of the system consecutively and are not interfered with. Thus, the system protocol provides for asynchronous transmission of reservation request packets at random times, and schedules all message data packets associated with reservation request packet which are received without collision, and schedules at least two message data packets associated with colliding reservation request packets based upon the relative times of arrivals of the colliding reservation request packets. After time T30 in FIG. 7, all transmitter-receivers revert to normal operation and transmit new reservation packets associated with new message data at randomly selected times.

Stacking is possible in a system such as that described in conjunction with FIG. 7. FIG. 8 includes time lines illustrating stacking. FIGS. 8a, 8c and 8d are identical to FIGS. 7a, c and d. FIG. 8b is very similar to FIG. 7b, and also illustrates reception activity at all transmitter-receivers. In FIG. 8, waveforms corresponding to those of FIG. 7 are designated by the same reference numerals. FIGS. 8e and 8f illustrate transmission activity at further third and fourth transmitter-receivers of the system. FIGS. 8e and 8f illustrate as waveforms 810 and 812 the transmission of reservation request packets by third and fourth transmitter-receivers, respectively, of the system of FIG. 1, at times T0'–T4' and T2'–T6', which are later than times T0–T6 at which reservation request packets were transmitted by transmitter-receiver 14 and 34. The third and fourth transmitter-receivers may be considered to be 24 and 44, respectively, of FIG. 1. Reservation request packets 810 and 812 are received by all transmitter-receiver of the system in a time interval T8'–T14', later than times T8–T14 at which colliding reservation request packets illustrated by 714 and 716 are received, as illustrated in FIG. 8b. At time T14, the third and fourth transmitter-receivers become aware that a collision has occurred among reservation request packets other than their own, and that the interval T14–T24 must be reserved for transmissions by other transmitter-receivers. Also at time T14, other transmitter-receivers of the system which have not transmitted reservation request packets become aware that a collision has occurred among reservation request packets, and that for the interval T14–T24 they must inhibit new transmissions. At time T14', the third transmitter-receiver, which had transmitted the reservation request packet represented by 810 of FIG. 8e, becomes aware that its own transmission was first among colliding packets and, but for the preexisting inhibition until time T24, would begin to transmit its own message data packets $D_r$ later, at time T16', as illustrated in phantom by 818' of FIG. 8e. However, because of the preexisting period of inhibition until time T24, the third transmitter-receiver delays its transmission at least until time T24, or, as illustrated, until a time T816 delayed from time T24 by a further guard interval. Thus, transmission of the message data packet by the third transmitter-receiver occurs in the interval T816–T818, as illustrated by 818 of FIG. 8e. In a similar manner, the fourth transmitter-receiver receives reservation request packets 714 and 716 in the interval T8–T14, and becomes aware at time T14 that a collision has taken place which requires a period of inhibition of transmission which extends to time T24. At time T14', the fourth transmitter-receiver becomes aware that its own received reservation request packet 816 is last in collision. The fourth transmitter-receiver responds by delaying transmission of its message data packet, illustrated as 822' of FIG. 8f, from interval T20'–T24' (in phantom in FIG. 8f), until the interval extending from time T820 to time T824, as illustrated by waveform 822 in FIG. 8f. All other transmitter-receivers of the system become aware of a first collision at time T14 and schedule themselves to inhibit new transmissions until time T24, and become aware of a second collision at time T14', which is responded to by extending the period of inhibition until time T824. As a result of this scheduling, message data transmissions occur sequentially and are received sequentially, without collision, as illustrated by waveforms 720, 724, 820, and by a further reception (not illustrated) corresponding to message data transmission 822.

Figure 9A:
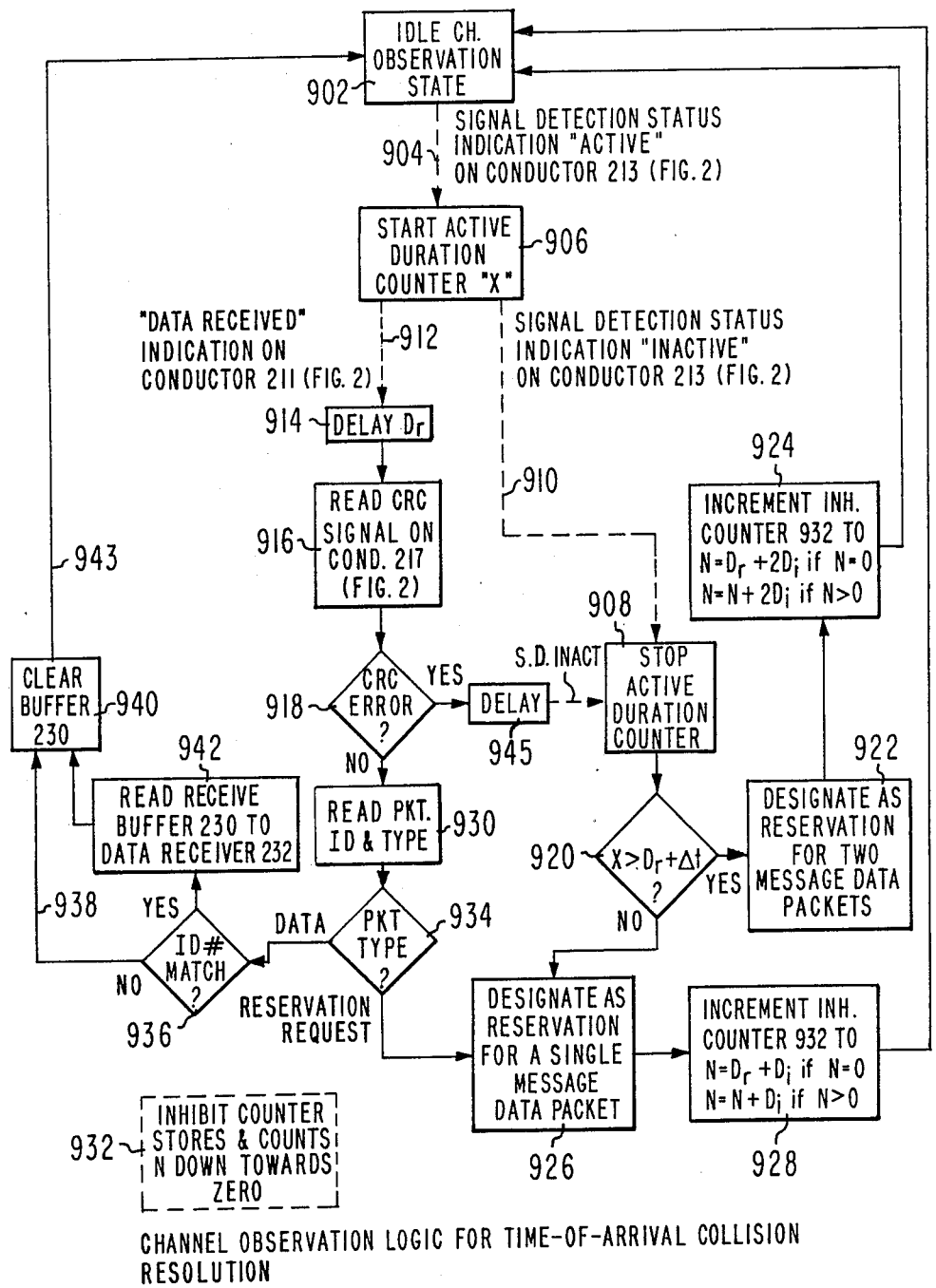
FIGS. 9a and 9b (referred to together as FIG. 9) are flow charts illustrating channel observation logic flow and transmission control logic flow functions, respectively, of logic unit 210 of FIG. 2 to provide asynchronous reservation and scheduling of data packet transmissions as illustrated in FIG. 7, and stacking as illustrated in FIG. 9.
Figure 9B:
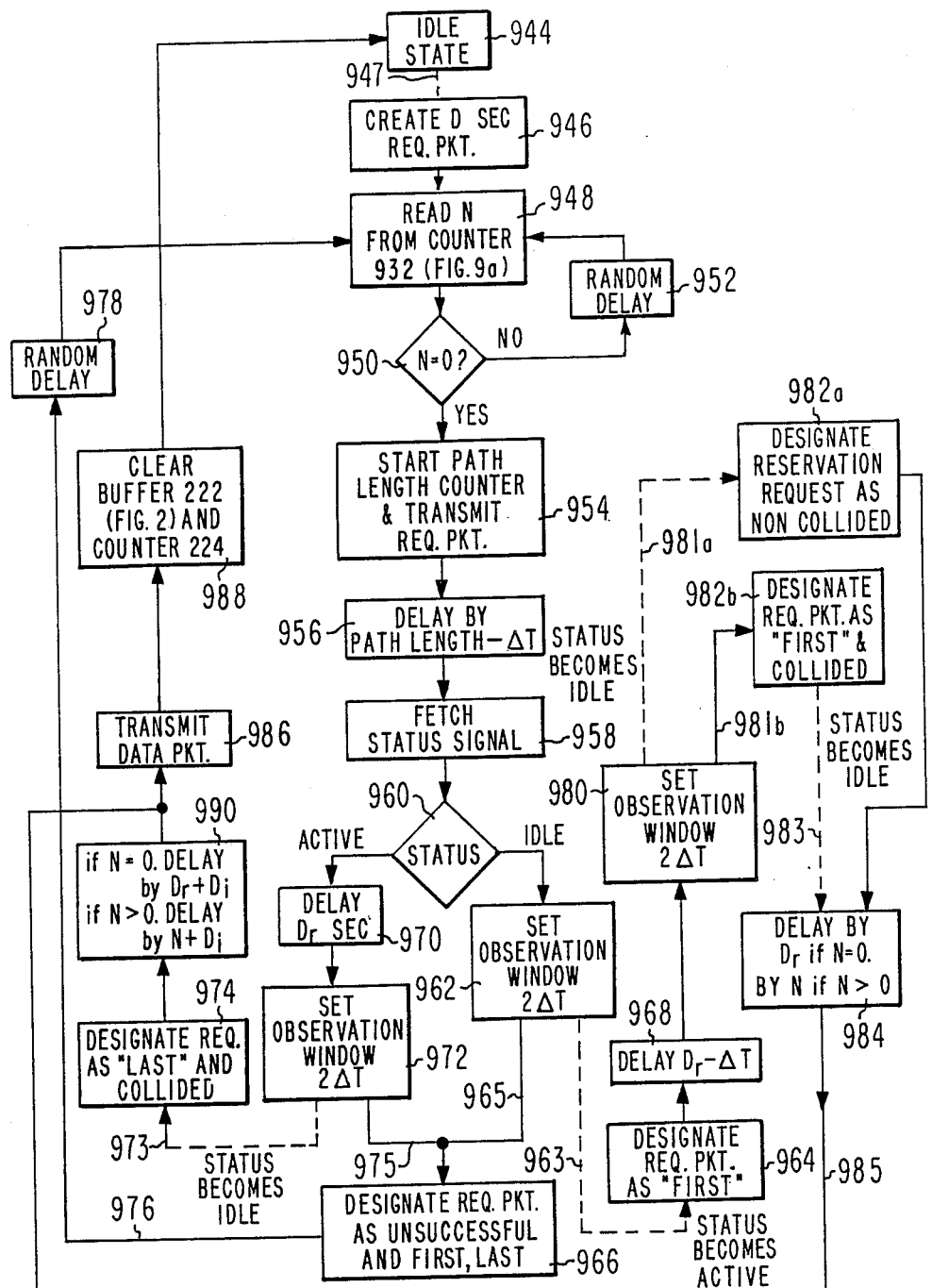

FIGS. 9a and 9b (referred to as together FIG. 9) together are a simplified block diagram of those portions of transmitter-receiver 14 (FIG. 2) which establish system access protocol for time-of-arrival based collision resolution among reservation request packets as described in conjunction with FIGS. 7 and 8. For this mode of operation, a transmitter-receiver of FIG. 2 requires an additional connection which has so far not been described. Referring to FIG. 2, RF subsystem 212 includes an activity detector 212' (illustrated by dashed lines) which responds to reception of radio frequency signals by antenna 12 for producing on conductor 213 a bilevel active/idle signal which is applied to logic unit 210. Activity detector 212' in principle constitutes no more than a diode detector and a filter capacitor for generating a logic high signal representing an ACTIVE condition when radio frequency signals are received, and for generating a logic low signal representing an IDLE channel condition during those times when radio frequency signals are not being received. Also, for this embodiment of the invention, $D_i$ read block 238 of FIG. 2 is not needed, since all message data packets have the same duration. The channel observation logic flow illustrated in FIG. 9a and the message transmission logic flow illustrated in FIG. 9b represent concurrent logic processing, and consequently require coacting microprocessors in logic unit 210, or an appropriately multiplexed single microprocessor.

In FIG. 9a, the idle channel observation state is represented by a block 902. The system remains in this state until such time as the status of the active/idle signal on conductor 213 (FIG. 2) becomes high to indicate an ACTIVE reception condition. Upon receipt of an ACTIVE signal, the logic flows by an interrupt or contingent logic path 904 to a block 906, which represents the starting of an active duration counter (not separately illustrated) internal to logic unit 210. The active duration counter produces a count or duration signal designated "X". Counting continues until the condition represented by a block 908 is reached, corresponding to the stopping of the active duration counter. Block 908 is reached by one of two paths. A first path is contingent path 910, which represents a transition of the active/idle signal on conductor 213 (FIG. 2) to the IDLE condition. A second path includes a contingent path 912 which is taken when the data received signal on conductor 211 of FIG. 2 indicates that modem 214 is receiving signal. Path 912 leads to a block 914 which represents a delay by $D_r$, the duration of one reservation request packet. Thus, at the time that the lagging edge of a reservation request packet is received by modem 214, logic flows from block 914 to a further block 916, which represents the reading of the CRC signal on conductor 217 of FIG. 2. The CRC signal having been read, decision block 918 evaluates for the presence or absense of an error. The YES output of decision block 918 directs the logic to block 945 where it awaits an interrupt from signal detection status becoming inactive, at which time the active duration counter is stopped. The alternative contingent logic path 910 causes termination of the active duration counter which begins counting at the moment that RF signals begin to be received, and stops counting when RF subsystem 212 stops receiving RF signals.

In either case, if two reservation request packets collide, the duration of the active interval will exceed $D_r$ (plus a guard interval $\Delta t$, if desired). This excessive active duration is a sign that a collision between reservation packets has occurred. The active duration count X is evaluated in decision block 920, and for a count greater than $D_r$, the YES output directs the logic to a block 922, representing the designation of the reception as a reservation of time for two message data packets. If there is a collision there must be at least two packets involved, the first and last of which are to result in message data packet scheduling. The logic then flows to a block 924, representing the incrementing of an inhibit counter illustrated in FIG. 9a as a dotted block 932, which is internal to logic unit 210. As in the case of inhibit counter 632 of FIG. 6a, inhibit counter 932 continually counts down towards zero. The incrementing represented by block 924 increments the current value N of counter 932 to a new value of N equal to $D_r$ plus $D_i$ (the duration of a message data packet) if N is initially zero, and sets the new value N to the previous value of N plus two $D_i$ if N is initially greater than zero. The logic then returns from block 924 to the idle channel observation state represented by block 902. Thus, in response to a collision among two or more reservation request packets, inhibit counter 932 is set to an inhibit duration N which is $D_r$ plus two $D_i$ in the absence of a previous period of inhibition, and which is simply incremented by two $D_i$ if a previous inhibition was enforced.

If two colliding reservation packets cause a CRC error in the data at some time after the second reservation request packet is received, the YES output of decision block 918 will cause the same incrementing to occur in block 924. On the other hand, an anomalous CRC error in a single, noncolliding reservation request packet will cause the logic to flow by the YES output of decision block 918 to block 945, after which the active duration count will stop at a count substantially equal to $D_r$, whereupon the logic flows from the NO output of decision block 920 to a further block 926, which represents designation of the reception as requiring reservation for a single message data packet. The logic then flows to a block 928, representing incrementing of the inhibit counter 932 to a new value of N which is equal to $D_r$ plus $D_i$ if N is initially zero, and to a new value of N equal to the previous value of N plus $D_i$ if N was initially greater than zero. The logic then flows from block 938 to the idle channel observation state represented by block 902.

In the case of reception of signals in which there is no CRC error, the NO output of decision block 918 directs the logic to a block 930, which represents the reading of the packet ID number and type in blocks 234 and 236 of FIG. 2. The logic flows from block 930 to packet type identification decision block 934, which represents a decision as to whether the received packet is a reservation request packet or a data packet. If the packet is a reservation request packet, the logic flows from block 934 to block 926, representing the designation of the request as that for a single message data packet interval. On the other hand, if the received packet is a data packet, the logic flows from decision block 934 to a further decision block 936, in which the ID number of the received data packet is compared with the local ID number. If the data packet is not intended for this particular transmitter-receiver, the ID numbers will not match, and the logic then flows by data path 938 to a block 940, representing the clearing of the received data from buffer 230 of FIG. 1. On the other hand, if the data packet has an ID number indicating that the data is for this particular transmitter-receiver, the data flows from decision block 936 to a further block 942, representing the reading of the received buffer 230 to data receiver 232, followed by block 940 representing the clearing of any residual information from buffer 230. The logic flows from block 940 by a path 943 back to block 902. The value of N stored in inhibit counter 932 of FIG. 9a is used in conjunction with the logic of FIG. 9b for message transmission control.

The message transmission logic flow illustrated in FIG. 9b starts from an idle state represented as a block 944. The logic flows from block 944 by way of an interrupt path 947 to a block 946 upon the arrival from a source of information such as 216 of FIG. 1 of information data to be transmitted. Block 946 (FIG. 9b) represents the creation of a corresponding reservation request packet having a duration of $D_r$ seconds. The logic flows from block 946 to a further block 948 which represents the reading of N from counter 932 of FIG. 9a. The value of N is compared with zero in a decision block 950. If N is not zero, the logic flows by the NO output of block 950 back to block 948 by way of a random delay illustrated as a block 952. Since counter 932 continually counts down towards zero, eventually the value of N will reach zero, and the logic will flow by the YES output of decision block 950 to a further block 954, representing the starting of a path length counter simultaneous with the beginning of transmission of the reservation request packet. The logic then is delayed by a duration equal to the path length delay minus a small incremental time $\Delta t$, as represented by block 956. The logic leaves block 956 at a time just before the leading edge of the transmitter-receiver's own reservation request packet is expected to return. The logic flows to a block 958 representing the reading of the channel receiving status signal from conductor 213 of FIG. 1. Decision block 960 decides whether the status signal represents ACTIVE or IDLE. If the status signal is IDLE just before the time the reservation request packet is to be received, the logic flows to a block 962 which represents the setting of an observation window having a duration of two $\Delta t$.

Figure 10A:
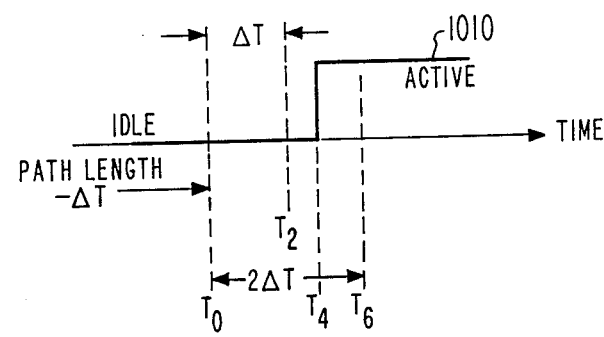
FIGS. 10a and 10b (referred to together as FIG. 10) are timing diagrams aiding in understanding occurrences during window intervals set by the logic of FIG. 9b.

FIG. 10a illustrates the timing of the observation window. In FIG. 10a, time T2 represents the expected time of arrival of the leading edge of the own reservation request packet. Time T0 represents a time earlier than time T2 by $\Delta t$, and therefore represents the time at which the logic flows from block 956 to blocks 958 and 960. The window established in block 962 has a duration of 2 $\Delta t$ and extends from time T0 to time T6. While the own reservation request packet may not return exactly at time T2 due to unavoidable system timing errors, it should return sometime within the interval T0-T6. As illustrated in FIG. 10a, the leading of the reservation request packet 1010 is received at time T4. As also illustrated, the receiving end of the transmission path is IDLE before time T4, thus indicating that the own reservation request packet is either not involved in the collision or if it is involved in a collision it is first among those colliding.

If the status signal on conductor 213 of FIG. 1 becomes active during the observation window, the logic flows from block 962 by interrupt path 963 to a block 964, which represents the designation of the own reservation request packet as first among those colliding. If the status signal does not become active at any time during the observation window extending from time T0 to time T6 of FIG. 10a, this indicates that the reservation request packet is for some reason not being received, and is therefore unsuccessful, whereupon the logic flows by path 965 to a block 966, representing designation of the own reservation packet as unsuccessful. In such an event the logic proceeds by path 976 and a random delay illustrated as a block 978 back to block 948 to initiate the process as so far described for retransmitting the reservation request packet.

Figure 10B:
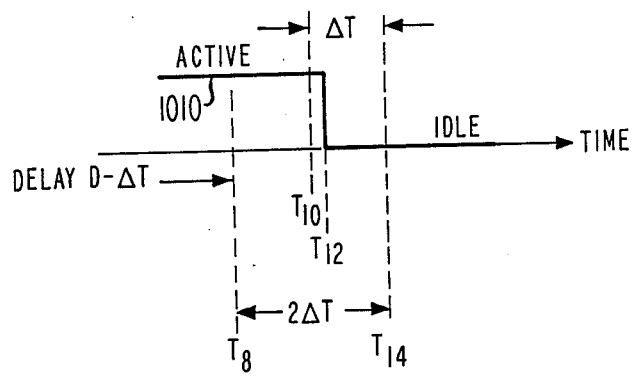

If the own reservation request packet was designated as "first" by reaching block 964 as a result of the status signal becoming active during the observation window (FIG. 10a) set in block 962, the logic flows through a block 968 representing a delay of $D_r$ minus $\Delta t$. This delay extends from the leading edge of the own reservation request packet until a time just before the lagging edge of the corresponding packet. FIG. 10b illustrates as a time T8 the time at which the delay imposed by block 968 expires. The logic then flows to a block 980 representing the setting of a second observation window, also having duration of 2 $\Delta t$. As illustrated in FIG. 10b, this observation window extends from time T8 to later time T14. As illustrated in FIG. 9b, the logic flows by an interrupt path 981a to a block 982a if the status signal on conductor 213 of FIG. 1 represents IDLE at any time during the observation window. As illustrated in FIG. 10b, the expected time of reception of the lagging edge of the own reservation request packet is time T10. However, due to system timing inaccuracies the lagging edge may occur anywhere within the window. The lagging edge as illustrated actually occurs at time T12. Thus, the status signal goes from ACTIVE to IDLE at time T12 within the observation window if there is no other packet being received, i.e. if there is no collision. Block 982a therefore represents designation of the own reservation request packet as noncollided, and the logic flows from block 982a to block 984. If the status signal does not become idle within the observation window, this must mean that the channel receive status remained ACTIVE throughout the entire observation window, which can only occur if another packet was received partially concurrently with the own reservation request packet, in which case a collision is occurring. If the status signal does not become idle during the observation window, the logic flows by path 981b to block 982b, representing the designation of the reservation request packet as first among those collided. At some later time, when the status becomes idle, the logic flows from block 982b by interrupt path 983 to block 984. Block 984 represents delay by a duration $D_r$ if N is zero, and by N if N is greater than zero. At the end of the delay period imposed by block 984, the logic flows by path 985 to a block 986, representing transmission of the message data packet. At the end of the transmission, the logic flows to a further block 988 representing the clearing of buffer 222 of FIG. 2 and the resetting of counter 224. Finally, the logic flows back to the idle state represented by block 944.

As so far described, the logic flows were those which occurred if the own reservation request packet as received was preceded by an IDLE interval, as determined by decision block 960, corresponding to a situation in which the own reservation request packet was first among those colliding or was the only reservation request packet received. It is also possible for the receiving end of the transmission channel to be in an ACTIVE condition (as indicated by the active/idle signal on conductor 213 of FIG. 2) prior to the expected time of arrival of the own reservation request packet. Referring to FIG. 10a, the channel could be receiving signal and therefore in an ACTIVE condition prior to time T0, the earliest time at which the leading edge of the own reservation request packet is expected to return. In such a case, decision block 960 decides that the channel status is active, and directs the logic to block 970, representing the imposition of a delay having a duration of $D_r$. At the expiration of $D_r$ seconds, the logic flows at a time corresponding to time T8 of FIG. 10b to a block 972, representing the setting of an observation window having a duration of 2 $\Delta t$. If the status signal becomes idle in the interval T8-T14, the logic flows by an interrupt path 973 to block 974. Block 974 represents the designation of the own reservation request packet as collided (because the receive channel was active immediately before the time of reception of the leading edge of the own reservation request packet) and last among those colliding, because the status signal became idle immediately after the lagging edge of the own packet was expected to be received. If, however, the status signal remains active throughout the interval T8-T14 set by block 972, the logic flows by path 975 to block 966. As mentioned, block 966 represents an unsuccessful reservation request packet. In this case, the reservation request packet is unsuccessful because it was neither first nor last among colliding packets. As also mentioned, this results in a retransmission of the unsuccessful reservation request packet.

If the own reservation request packet is last among those colliding as established by block 974, the logic flows to a block 990 in which a delay is imposed. The delay is $D_r$ plus $D_i$ if N is initially zero, and if N is initially zero, the delay is by N plus $D_i$. At the expiration of the delay imposed by block 990, the message data packet is transmitted, as represented by block 986, and the buffers and counters are cleared as described previously.

As so far described, this second embodiment of the invention schedules message data transmissions corresponding to the first and last reservation request packets involved in collision, based upon the relative times of arrival of the colliding reservation request packets. The determination of first and last is similar to that described in copending patent application Ser. No. 802,999, filed Nov. 29, 1985, in the name of Raychaudhuri, and entitled "Asynchronous Random Access Communication System With Collision Resolution Based On Time Of Arrival". Other methods of collision resolution based upon time of arrival are described therein, which allow resolution of, for example, the first, second, penultimate and last packets among colliding packets. The methods of resolution of colliding packets as described therein may be applied to colliding reservation request packets for scheduling the transmission of more than two message data packets without the need for retransmitting all the colliding reservation request packets.

Other embodiments of the invention will be apparent to those skilled in the art. For example, the guard intervals may be eliminated or expanded as required by system timing inaccuracies. The inhibition of all transmitter-receivers immediately after reception of a colliding or noncolliding reservation request packet for a period of $D_r$ may be reduced or eliminated, so that the transmission of a message data packet begins closer to or immediately following the time of completion of reception of a reservation request packet so long as reservation request packets in the process of transmission are truncated immediately after reception of the reservation request packet which initiates the transmission of the message data packet; this may be advantageous depending upon the relative lengths of the reservation request and message data packets, and also depending upon the system loading. It is possible to operate in a mode in which noncolliding reception of a reservation request packet results in scheduling for a random-length message data packet (i.e. a message data packet having the full message duration) to maximize throughput, but in the event of a collision among reservation request packets to schedule fixed duration message data packets without retransmission of the resolved reservation request packets, which may be advantageous for certain system loadings and message lengths.

What is claimed is:

1. A random access contention system for providing packet communications among a plurality of transmitter-receivers by way of different paths through a transmission medium, each path being used for transmission of both reservation request packets and data packets and exhibiting a respective similar-value transmission delay therethrough of substantial length compared to the durations of at least some packets, no path between each different pair of transmitter-receivers being fully included in the path between any other different pair of transmitter-receivers, said system comprising:

transmission means associated with each transmitter-receiver, said transmission means being coupled to said transmission medium and adapted for accepting information to be transmitted, for forming said information into at least one data packet for scheduled transmission by way of said transmission medium, for generating at least one reservation request packet associated with each said data packet, and for transmitting one of said reservation request packets by way of said tarnsmission medium at a random time other than when transmission by that transmission means is inhibited, each said reservation request packet being of a similar duration that is many times shorter than the similar-value transmission delay between each pair of transmitter-receivers and substantially shorter than at least most said data packets;

receiving means associated with each transmitter-receiver and coupled to said transmission medium for receiving its own reservation request packets and other packets originating from other transmitter-receivers;

means for controlling when data packets are transmitted by each transmitter-receiver so as to avoid collision with any said reservation request packet and with data packets from any other of said plurality of transmitter-receivers, which means includes respective status determining means associated with each transmitter-receiver and coupled to the associated receiving means, and respective control and scheduling means associated with each transmitter-receiver and coupled to the associated status determining means and transmission means;

respective means included within the status determining means of each transmitter-receiver, for identifying the successful reception by that transmitter-receiver of its said own reservation packet and for generating in response an own successful reservation request signal;

respective means included within the status determining means of each transmitter-receiver, for identifying the successful reception by the transmitter-receiver of a reservation packet other than its own, and generating in response an other successful reservation request signal;

respective means included within the said control and scheduling means of each said transmitter-receiver for causing said transmission means of that transmitter-receiver means to begin transmission of a said data packet thereof in response to said successful own reservation request signal, said transmission of said data packet beginning at an initiation time delayed from said successful reception of its said own reservation request packet by a time delay, said time delay having a first delay component and a second delay component, said first delay component being at least as long as the duration of one of said reservation request packets but many times shorter than any of said similar-value transmission delays, and said second delay component being at times zero-valued; and respective inhibiting means included in the control and scheduling means of each transmitter-receiver for inhibiting all transmission from the transmission means of that transmitter-receiver for a selected time following said initiation time in response to said other successful reservation request signal, which inhibiting thereby determines the duration of said second delay component for that transmitter-receiver.

2. A system according to claim 1 wherein said control and scheduling means further comprises stacking means coupled to said status determining means for, in response to said successful own reservation request signal, causing said data packet to be transmitted by said transmission means beginning at the later of said initiation time and the end of said selected time.

3. A system according to claim 1 wherein said transmission means includes means for encoding said reservation request packet with time information relating to the duration of the associated one of said data packets;

said receiving means includes means for decoding said time information to form decoded time information; and said control and scheduling means further sets said selected time in response to said decoded time information.

4. A system according to claim 1 wherein:

said transmission means includes means for forming said data packets with uniform duration; and said control and scheduling means further comprises means for setting said selected time to one of zero time and an integer multiple of said uniform duration, said integer including unity.

5. A system according to claim 4 wherein:

said status determining means further comprises first collision resolution means for determining if said own reservation request packet is the first received among a plurality of packets received at overlapping times, and for generating a FIRST signal in response thereto; and said control and scheduling means further comprises means for setting said selected time to one of said zero time and unity multiple of said uniform duration, in response to said FIRST signal.

6. A system according to claim 5 wherein:

said status determining means further comprises second collision resolution means for determining if said own reservation request packet is the last received among a plurality of packets and for generating a LAST signal in response thereto; and said control and scheduling means further comprises means for setting said selected time to the other one of said zero time and unity multiple of said uniform duration, in response to said LAST signal.

7. A system according to claim 1 wherein:

said status determining means further comprises means for producing an own reservation packet collision signal in response to unsuccessful reception of said own reservation request packet; and said control and scheduling means further comprises retransmission control means for causing said transmission means to retransmit said reservation request packet at a random time in response to said own reservation packet collision signal.

8. A system according to claim 7 wherein:

said data packets formed by said transmission means are of uniform duration;

said status determining means further comprises means for producing, in the event of a collision of said own reservation request packet, a FIRST signal if said own packet is first among those colliding, and a LAST signal if said own packet is last among those colliding; and said control and scheduling means further comprises means for setting said initiation time to a time delayed from the reception of the last signal among those colliding by said time equal to the duration of one of said reservation request packets, and for causing said transmission means to begin to transmit said data packet in response to said FIRST signal at said initiation time, and for setting said initiation time to a time delayed from the reception of the last signal among those colliding by the sum of said time equal to the duration of one of said reservation request packets plus said uniform duration, and for causing said transmission means to begin to transmit said data packet in response to said LAST signal at said initiation time.

9. A random access contention system for providing packet communications among a plurality of transmitter-receivers by way of different paths through a transmission medium, each path being used for transmission of both reservation request packets and data packets and exhibiting a respective similar-value transmission delay therethrough of substantial length compared to the durations of at least some packets, no path between each different pair of transmitter-receivers being fully included in the path between any other different pair of transmitter-receivers, said system comprising:

transmission means associated with each transmitter-receiver and coupled to said transmission medium, and adapted for accepting information to be transmitted, for forming the information into data packets, each of which requires a uniform a duration for scheduled transmission by way of said transmission medium, for generating in association with each of said data packets a reservation request packet requiring a second duration for transmission, for originally transmitting said reservation request packet by way of said transmission medium at a random time other than when transmission by that transmission means is inhibited, for transmitting said data packet upon receipt of a data transmit command, for retransmitting said reservation request packet at a random time in response to a reservation request packet retransmit command, and for being inhibited from transmitting by an inhibit signal, each said reservation request packet being of similar duration that is many times shorter than the transmission delay between each pair of transmitter-receivers and substantially shorter than at least most said data packets;

receiving means associated with each transmitter-receiver and coupled to said transmission path, and adapted for receiving from said transmission medium its own reservation request packet originating with the associated said transmission means and also adapted for receiving other packets originating from other transmitter-receivers;

means for controlling when data packets are transmitted by each transmitter-receiver so as to avoid collision with any said reservation request packet and with data packets fro many other of said plurality of transmitter-receivers, which means includes the elements claimed hereinafter;

status determining means associated with each transmitter-receiver and coupled to the associated said transmission means and to the associated said receiving means for establishing the successful transmission or collision of said own reservation request packet and the successful transmission of other reservation request packets; and control and scheduling means associated with each transmitter-receiver and coupled to the associated said transmission means and to the associated said status determining means for generating and coupling said inhibit signal to said transmission means for inhibiting all transmission from said transmission means for a selected duration following successful transmission of each of said other reservation request packet retransmission command to said transmission means in response to at least some collisions of said own reservation request packet, and for generating and coupling said data transmission command to said transmission means at a time delayed by at least said second duration in response to successful transmission of said own reservation request packet.

10. A contention type random access system for burst communication ammong a plurality of transmitter-receivers by way of a transmission mediuim, the transmission path through said medium between any transmitter and any receiver having a time delay which is long compared with the duration of an information packet, so that the current status of its transmission path cannot be determined by any transmitter-receiver, the system comprising:

a source of information to be transmitted associated with each transmitter-receiver, said information being intended for at lest one transmitter-receiver ohter than the transmitting transmitter-receiver;

controllable transmission means associated with each transmitter-receiver and coupled to the associated said source of information for receiving said information to be transmitted and for forming said information to be transmitted into information packets of uniform duration, and for each information packet generating and transmitting at least one reservation request over said transmission medium in the form of at least one reservation request packet, each having a leading edge, a predetermined duration, and a lagging edge;

receiving means associated with each transmitter-receiver and coupled to said transmission medium for receiving from. said transmission medium its own reservation request packets originating from the associated said transmission means, and for receiving other reservation request packets and other information packets originating from transmission means associated with other transmitter-receivers, said receiving means producing idle signals when each said transmission path thereto is idle and also producing active signals when any one of said transmission paths thereto is active;

in each transmitter-receiver respective first timing means coupled to said receiving means and to said transmitting means and responsive to said active and idle signals for generating a first signal when each said transmission path thereto is idle for an interval preceding and contiguous with the expected time of reception of a leading edge of its own reservation request packet transmitted by the associated transmission means, for generating a second signal when at least one said transmission path thereto is active for an interval preceding and contiguous with said expected time of reception of said leading edge of said own reservation request packet, for genrating a third signal when each said transmission path thereto is idle for an interval following and contiguous with a lagging edge of said own resrvation request packet, for generating a fourth signal when at least one said transmission path thereto is active for an interval following and contiguous with said time of reception of said lagging edge of said own reservation request packet, for generating a fifth signal when a said other reservation request packet having said predetermined duration is received from said other transmission-receivers, indicative of a successful reservation request transmission, and for generating a sixth signal when a reservation request packet having in excess of said predetermined duration is received from said other transmitter-receivers, indicative of a collision; and in each transmitter-receiver, respective control means coupled to said transmission means, to said receiving means and to said timing means, for inhibiting said transmission means from transmitting reservation request and information packets for a time equal to the sum of two of said uniform durations plus one said predetermined duration in response to said sixth signal, for inhibiting said transmission means form transmitting reservation request and information packets for a time equal to the sum of the a predetermined number of said uniform durations and one of said predetermined durations in response to said fifth signal, for causing, in response to said first and fourth signals, said transmission means to transmit said information packet beginning at a time following a time marker by said predetermined duration, and for causing, in response to said second and third signals, said transmission means to transmit said information packet beginning at a time following said time marker by the sum of said predetermined duration and said uniform duration.

11. A transmitter-receiver for a random access system for burst communications among a plurality of similar associated transmitter-receivers by way of a transmission medium, the transmission path through said medium between any transmitter and any receiver, including the associated receiver, having a time delay which is long by comparision with the duration of an information packet, the transmitter-receiver comprising:

transmission means adapted to be coupled to said transmission medium and adapted to be coupled to a source of information to be transmitted for forming said information to be transmitted into information packets having nonumiform duration, and for forming one or more reservation reqeust packets of predetermined duration associated with each of said information packets, which reservation request packets bear information relating to the duration of the associated information packet, and which are intended to reserve an information packet transmission time for said associated information packets which reserved time begins one said predetermined duration following successful reception of said reservation request packets, and for transmitting said reservation request packets at random times;

receiving means adapted to be coupled to said transmission medium for receiving therefrom its own reservation request packets orginating from said associated transmission means, and other information packets and other reservation request packets originating from other transmitter-receivers;

timing and logic means ocupled to said receiving means and to said transmission means for identifying successful reception of said other reservation request packets and successful reception of said own reservation request packets; and control and timing means coupled to said transmission means, to said receiving means and to said timing and logic means for inhibiting said transmission means in response to successful reception of each of said other reservation request packets for an original inhibited time period equal to the sum of said predetermined duration plus the information packet duration borne by said other reservation request packet, for extending said original inhibited time period by the information packet duratlion borne by a successfully received other reservation request packet intended for reserving information packet transmission time beginning before the expiration of said original inhibited time period, and for causing said transmission means in response to successful reception of one of said own reservation request packets to transmit said information packet associated with said own reservation request packet beginning at a time which is the later of one said predetermined duration following successful reception of said own reservation request packet and the expiration of one of said original and extended inhibited time periods.

12. A transmitter-receiver for a random access system for burst communications among a plurality of similar associated transmitter-receivers by way of a transmission medium, the transmission path through said medium between any transmitter and any receiver, including the associated receiver, having a time delay which is long by comparision with the duration of an information packet, the transmitter-receiver comprising:

controllable transmission means adapted to be coupled to said transmission medium and adapted to be coupled to a source of information to be transmitted for forming said information to be transmitted into information packets of uniform duration, and for forming one or more reservation request packets of predetermined duration in association with each of said information packets, and for transmitting said reservation request packets so formed at random times;

receiving means adapted to be coupled to said transmission medium for receiving therefrom its own reservation request packets originating from the associated said transmission means, other reservation request packets originating from other transmitter-rceivers of the system, and other information packets originating form other transmitter-receivers of the system;

status deteriming means coupled to said receiving means for producing third and fourth signals indicative of successful reception of said own reservation request packets and said other reservation request packets, respectively, for generating an other reservation request packet collision signal in response to a collision of two or more packets other than said own reservation request packets and, for generating one of a FIRST signal when said own rservation request packet is earliest among a plurality of colliding packets and a LAST signal when said own resrvation request packet is latest among a plurality of colliding packets; and control means coupled to said status determining means and to said transmission means for inhibiting said transmission means from: all transmission for a duration plus one said uniform duration in response to said fourth signal, for causing said transmission means to transmit said own information packet beginning at a time delayed from a time maerker by one said predetermined duration in response to one of said third signal and said FIRST signal, for inhibiting said transmission means from all transmission for a duration which is equal to the sum of two said uniform durations plus one said predetermined duration in response to said other reservation request packet collision signal, and for causing said transmission means to transmit said own information packet beginning at a time delayed from said time marker by the sum of said predetermined duration plus one said uniform duration in response to said LAST signal.

13. A method for burst communication among a plurality of similar associated non-relaying transmitter-receivers by way of a transmission medium, the transmission path through said medium between each pair of transmitter-receivers having a time delay which is long by comparison with the duration of an information packet, the method comprising the steps at each transmitter-receiver of:

arranging for the time delays between each pair of transmitter-receivers to be substantially the same, accepting offered information to be transmitted to form accepted information;

forming said accepted information into information packets to be transmitted;

forming a reservation request packet of predetrmined duration associated with each one of said information packets;

selecting a random time during which any said transmitter-receiver is not inhibited from all transmission for transmitting one of said reservation request packets via said transmission meidum;

transmitting said one of said reservation request packets into the sending end of transmission paths through said transmission medium at said random time;

receiving from said transmission medium own reservation request packets originating from the same transmitter-receiver by which they are received, other reservation request packets originating from transmitter-receivers other than the receiving transmitter-receiver, and information packets;

setting a time marker corresponding to the end of each continuous period of reception which includes a reservation request packet;

inhibiting all transmissions in response to noncolliding reception of one of said other reservation request packets, for a period of time beghinning from said time marker and extending for at least the sum of said predetermined duration plus the duration of that oen of said information packets associated with said one of said other reservation request packet successfully received;

in response to noncolliding reception of an own reservation request packet, transmitting that one of said information packets associated with said own reservation request packet noncollidingly received, beginning at a time delayed from said time marker by at least said predetermined duration.

14. A method according to claim 13, wherein:

said step of forming said accepted information into information packets further comprises the step of forming said information packets with uniform duration; and further comprising steps of:

inhibiting all transmissions in response to reception of colliding other reservation request packets, for a period of time beginning at said time marker and extending for a duration equal to the sum of one said predetermined duration plus two said uniform durations;

in response to colliding reception of said own reservation request packet determining if said own packet was first, last or neither first nor last in collision;

inhibiting all transmission in response to colliding reception of said own reservation request packet and a determination that said own reservation request packet was one of first and last in collision, for a period extending from said time marker of one said predetermined duration, and immediately thereafter transmitting that one of said information packets associated with said own reservation request packet which was said one of first and last in collision; and inhibiting all transmission in response to colliding reception of said own reservation request packet and a determination that said own reservation request packet was neither first nor last, for a period extending from said time marker at least equal to the sum of said predetermined duration plus one said uniform duration.

15. A method according to claim 14, further comprising the steps of:

in response to colliding reception of said own reservation request packet and a determination that said own reservation request packet was the other one of first and last in collision, transmitting that one of said information packets associated with said own reservation request packet which was said other one of first and last in collision, beginning at a time following said time marker by the sum of one said predetermined duration plus one said uniform duration; and in response to colliding reception of said own reservation request packet and a determination that said own reservation request packet was neither first nor last, inhibiting all transmission for a further period of one said uniform duration for a total period of inhibition measured from said time marker of the sum of one said predetermined duration plus tw said uniform durations.

16. A method according to claim 13, wherein:

said step of forming said accepted information into information packets to be transmitted includes the step of forming said information packets to be transmitted with nonuniform duration;

said step of forming a reservation request packet includes the step of loading said reservation request packet with duration information relating to the duration of said nonuniform duration of that information packet associated with said reservation request packet; and further comprising the step of:

after said receiving step, if possible extracting from said own and said other reservation request packets said duration information borne by said own and other reservation request packets; and in response to collision of said own packet, whereby said duration information cannot be extracted, retransmitting said own reservation request packet through said transmission medium at a random time during which all transmission is not inhibited.

17. A method according to claim 16, further comprising the steps of:

in response to noncolliding reception of one of said other reservation request packets sequentially received following a prior noncolliding reception of one of said own and said other reservation request packet by a time period less than the duration of that one of said information packets associated with that one of said reservation request packets involved in said prior reception, inhibiting all transmission for a further period equal to the duration of that information packet associated with the second of said sequentially received other reservation request packets; and in response to noncolliding reception of one of said own reservation request packets sequentially received following a prior noncolliding reception of one of said own and said other reservation request packets by a time period less than the duration of that one of said information packets associated with that one of said reservation request packets involved in said prior reception, transmitting that one of said information packets associated with the second of said sequentially received own reservation request packets.

18. A transmitter-receiver for a random access system for burst communications among a plurality of like transmitter-receivers by way of a transmission medium, each transmission path through said medium between any transmitter and any receiver, including the associated receiver, having a time delay which is long by comparison with the duration of an information packet, the transmitter-receiver comprising:

controllable transmission means coupled to said transmission medium and adpated to be coupled to a source of information to be transmitted for forming said information into information packets having an random duration, for forming one or more reservation request packets associated with each information packet, said reservation request packets including a leading edge, a predetermined duration, and a lagging edge, and time information relating to said duration of said information packet with which they are associated, for controllably transmitting said information packets by way of a path through said transmission meidum, and for one of originally transmitting said reservation request packets and retransmitting said reservation request packets in the form of retransmitted reservation request packets;

receiving means coupled to said transmission medium for receiving from said transmission medium information packets and for also receiving from said transmission medium its own originally transmitted reservation request packets originating from the associated transmission means, other originally transmitted reservation request packets, and other retransmitted reservation request packets originating from other transmitter-receivers in said system, for producing idle signals when each of the transmission paths thereto through said transmission medium is idle and for producing active signals when any said transmission path thereto is active;

timing and logic means coupled to said transmission means and to said receiving means for generating a first signal in response to said idle signal occurring immediately preceding the expected time of reception of a leading edge of each return own reservation request packet, for generating a second signal in response to said active signal occurring immediately preceding said expected time of reception of said leading edge of each returned own reservation request packet, for generating a third signal in response to said active signal immediately following the expected time of receipt of a lagging edge of each returned own reservation request packet, for generating a fourth signal in response to said idle signal occurring immediately following said expected time of receipt of said lagging edge of each said own reservation request packet, for generating a fifth signal in response to said active signals being produced continuously for a period exceeding said predetermined duration, and for generating a timing marker at the moment said active signals are no longer produced; and control means coupled to said timing and logic means, to said receiving means and to said trransmission means for inhibiting said transmission means in response to said first and fourth signals associated with reception of an other reservation request packet for an inhibited period measured from said timing marker which is at least equal to the sum of said predetermined duration plus said duration indicated by said time information associated with said other reservation request packet, for causing said transmission means to transmit said information packet in response to said first and fourth signals associated with reception of said own reservation request packet beginning at a time measured from said timing marker at least equal to a said predetermined duration, for causing said transmission means to retransmit at a random time said own reservation request packet in response to either of said second and third signals associated with reception of said own packet.

* * * * *